(12) United States Patent
Li et al.

(10) Patent No.: US 10,957,205 B2
(45) Date of Patent: Mar. 23, 2021

(54) FLIGHT TAG OBTAINING METHOD, TERMINAL, AND SERVER

(71) Applicant: TENCENT TECHNOLOGY (SHENZHEN) COMPANY LIMITED, Shenzhen (CN)

(72) Inventors: Kaifeng Li, Shenzhen (CN); Jia Wei, Shenzhen (CN); Jialun Li, Shenzhen (CN); Xiangxin Zhang, Shenzhen (CN); Qiuli Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 233 days.

(21) Appl. No.: 15/991,872

(22) Filed: May 29, 2018

(65) Prior Publication Data

US 2018/0276997 A1   Sep. 27, 2018

Related U.S. Application Data

(63) Continuation of application No. PCT/CN2017/078805, filed on Mar. 30, 2017.

(30) Foreign Application Priority Data

Apr. 1, 2016 (CN) .......................... 201610203591.1

(51) Int. Cl.
*G08G 5/00* (2006.01)
*G06F 16/29* (2019.01)
*H04W 4/44* (2018.01)
*G06F 16/00* (2019.01)
*H04W 4/029* (2018.01)
*H04W 4/40* (2018.01)
(Continued)

(52) U.S. Cl.
CPC .......... *G08G 5/0013* (2013.01); *G01S 5/0027* (2013.01); *G06F 16/00* (2019.01);
(Continued)

(58) Field of Classification Search
CPC ..... G08G 5/0013; G08G 5/0043; H04W 4/44; H04W 4/029; G06F 16/00; G06F 16/29; G01S 5/0027; B64C 39/024
(Continued)

(56) References Cited

U.S. PATENT DOCUMENTS 10,586,464 B2 * 3/2020 Dupray .............. H04B 7/18504
10,657,827 B2 * 5/2020 Eyhorn ................ G08G 5/0082
(Continued)

FOREIGN PATENT DOCUMENTS

CN     104679873 A     6/2015
CN     104950903 A     9/2015
(Continued)

OTHER PUBLICATIONS

International Search Report dated Jun. 30, 2017 in PCT/CN2017/078805 with English translation.
(Continued)

*Primary Examiner* — Krishnan Ramesh
(74) *Attorney, Agent, or Firm* — Oblon, McClelland, Maier & Neustadt, L.L.P.

(57) ABSTRACT

This application discloses a flight tag obtaining method, terminal, and server. A takeoff geographic location of a first unmanned aerial vehicle can be obtained when the first unmanned aerial vehicle takes off. The takeoff geographic location of the first unmanned aerial vehicle can then be sent to a server. A flight tag returned by the server can be obtained. The flight tag can indicate whether another aerial vehicle took off from the takeoff geographic location of the first unmanned aerial vehicle before the first unmanned aerial vehicle.

20 Claims, 7 Drawing Sheets

(51) Int. Cl.
*G01S 5/00* (2006.01)
*H04W 4/021* (2018.01)

(52) U.S. Cl.
CPC ........... *G06F 16/29* (2019.01); *G08G 5/0043* (2013.01); *G08G 5/0069* (2013.01); *H04W 4/021* (2013.01); *H04W 4/029* (2018.02); *H04W 4/40* (2018.02); *H04W 4/44* (2018.02)

(58) Field of Classification Search
USPC ........................................................ 701/120
See application file for complete search history.

(56) References Cited

U.S. PATENT DOCUMENTS

| | | | | |
|---|---|---|---|---|
| 2017/0069214 A1* | 3/2017 | Dupray | ................ | G08G 5/0013 |
| 2018/0061243 A1* | 3/2018 | Shloosh | ................ | G08G 5/0091 |
| 2018/0357909 A1* | 12/2018 | Eyhorn | ................ | G08G 5/0013 |

FOREIGN PATENT DOCUMENTS

| | | |
|---|---|---|
| CN | 105206114 A | 12/2015 |
| CN | 105398571 A | 3/2016 |
| CN | 105677930 A | 6/2016 |
| WO | WO 2014146169 A1 | 9/2014 |

OTHER PUBLICATIONS

Chinese Office Action dated Sep. 25, 2017 in Application No. 201610203591.1 with concise English translation.

* cited by examiner

ND SERVER

FLIGHT TAG OBTAINING METHOD, TERMINAL, AND SERVER

RELATED APPLICATION

This application is a continuation of International Application No. PCT/CN2017/078805, filed on Mar. 30, 2017, which claims priority to Chinese Patent Application No. 201610203591.1, entitled "FLIGHT TAG OBTAINING METHOD, TERMINAL, AND SERVER", filed with the Chinese Patent Office on Apr. 1, 2016. The entire disclosures of the prior applications are hereby incorporated by reference in their entirety.

FIELD OF THE TECHNOLOGY

This application relates to a flight tag obtaining method, terminal, and server.

BACKGROUND OF THE DISCLOSURE

Currently, an existing unmanned aerial vehicle usually stores flight data in the unmanned aerial vehicle. The flight data is used for recording a flight parameter in a flying process or tracking a flight fault, and is used by the unmanned aerial vehicle itself. However, when such a manner is used, flight records of another unmanned aerial vehicle cannot be learned due to a lack of interaction. Consequently, flight data of unmanned aerial vehicles cannot be shared, and flight data of a plurality of unmanned aerial vehicles cannot be processed. For example, competition, learning, emulation, collection of the flight data, and the like cannot be performed between the plurality of unmanned aerial vehicles.

For the foregoing problem, at present, no effective solution has been proposed.

SUMMARY

Embodiments of this application provide a flight tag obtaining method, terminal, and server, to at least resolve a technical problem that a flight tag of an unmanned aerial vehicle cannot be obtained by using the existing technology.

According to an aspect of an embodiment of this application, there is provided a non-transitory computer-readable medium storing instructions which when executed by at least one processor cause the at least one processor to perform operations that can include obtaining a takeoff geographic location of a first unmanned aerial vehicle when the first unmanned aerial vehicle takes off. The takeoff geographic location of the first unmanned aerial vehicle is sent to a server. A flight tag returned by the server is obtained. The flight tag indicates whether another unmanned aerial vehicle took off from the takeoff geographic location of the first unmanned aerial vehicle before the first unmanned aerial vehicle.

According to another aspect of an embodiment of this application, a method is further provided. A takeoff geographic location of a first unmanned aerial vehicle is received by a server from an information processing apparatus when the first unmanned aerial vehicle takes off. A determination is made by the server as to whether the received takeoff geographic location of the first unmanned aerial vehicle is included in a plurality of stored takeoff geographic locations. When the takeoff geographic location of the first unmanned aerial vehicle is included in the stored takeoff geographic locations, a first flight tag is sent by the server to the information processing apparatus. The first flight tag indicates that another unmanned aerial vehicle took off from the takeoff location of the first unmanned aerial vehicle before the first unmanned aerial vehicle. When the takeoff geographic location of the first unmanned aerial vehicle is not included in the stored takeoff geographic locations, a second flight tag is sent by the server to the information processing apparatus. The second flight tag indicates that another unmanned aerial vehicle has not taken off from the takeoff location of the first unmanned aerial vehicle before the first unmanned aerial vehicle.

According to still another aspect of an embodiment of this application, an information processing apparatus is further provided. Processing circuitry of the terminal obtains a takeoff geographic location of a first unmanned aerial vehicle when the first unmanned aerial vehicle takes off. The processing circuitry sends the takeoff geographic location of the first unmanned aerial vehicle to a server. The processing circuitry further obtains a flight tag returned by the server. The flight tag indicates whether another unmanned aerial vehicle took off from the takeoff geographic location of the first unmanned aerial vehicle before the first unmanned aerial vehicle.

According to still another aspect of an embodiment of this application, an apparatus is further provided. Processing circuitry of the apparatus receives a takeoff geographic location of a first unmanned aerial vehicle from an information processing apparatus when the first unmanned aerial vehicle takes off. The processing circuitry determines whether the received takeoff geographic location of the first unmanned aerial vehicle is included in a plurality of stored takeoff geographic locations. When the takeoff geographic location of the first unmanned aerial vehicle is included in the stored takeoff geographic locations, the processing circuitry sends a first flight tag to the information processing apparatus. The first flight tag indicates that another unmanned aerial vehicle took off from the takeoff geographic location of the first unmanned aerial vehicle before the first unmanned aerial vehicle. When the takeoff geographic location of the first unmanned aerial vehicle is not included in the stored takeoff geographic locations, the processing circuitry sends a second flight tag to the information processing apparatus. The second flight tag indicates that another unmanned aerial vehicle has not taken off from the takeoff geographic location of the first unmanned aerial vehicle before the first unmanned aerial vehicle.

In embodiments of this application, a client running on an information processing apparatus obtains a takeoff geographic location of a first unmanned aerial vehicle when the first unmanned aerial vehicle takes off. The client sends the takeoff geographic location to a server; and obtains a flight tag returned by the server. The flight tag is used for indicating whether the first unmanned aerial vehicle is an unmanned aerial vehicle first taking off from the takeoff geographic location of the first unmanned aerial vehicle. The takeoff geographic location obtained when the unmanned aerial vehicle takes off is sent to the server, so that the server establishes a common database of unmanned aerial vehicles on the server by using the obtained takeoff geographic location of the unmanned aerial vehicle. Further, the database is used for establishing interaction between the client running on the control terminal and the server, to implement sharing of the takeoff geographic location of the unmanned aerial vehicle, and return a flight tag corresponding to the unmanned aerial vehicle to the control terminal according to the takeoff geographic location of the unmanned aerial vehicle. Therefore, the technical problem that a flight tag of an unmanned aerial vehicle cannot be obtained by using the existing technology is resolved, to implement sharing of the foregoing flight tag of the unmanned aerial vehicle in social space of the client.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the figures.

DESCRIPTION OF EMBODIMENTS

To make persons skilled in the art understand the solutions in this application better, the following clearly and completely describes the technical solutions in the embodiments of this application with reference to the accompanying drawings in the embodiments of this application. The described embodiments are merely some but not all of the embodiments of this application. All other embodiments obtained by persons of ordinary skill in the art based on the embodiments of this application shall fall within the protection scope of this application.

It should be noted that, in the specification, claims, and accompanying drawings of this application, the terms "first", "second", and so on are intended to distinguish between similar objects rather than describe a specific order. It should be understood that, the terms used in this way is exchangeable in a proper case, so that the embodiments described herein of this application can be implemented in another order except those shown or described herein. Moreover, the terms "include", "contain" and any other variants mean to cover the non-exclusive inclusion, for example, a process, method, system, product, or device that includes a list of steps or units is not necessarily limited to those steps and units, but may include other steps or units not expressly listed or inherent to such a process, method, product, or device.

Embodiment 1

Figure 1:
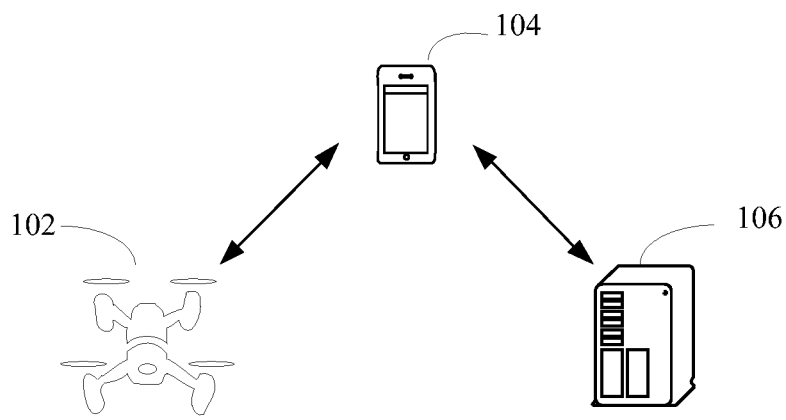
FIG. 1 is a schematic diagram of an application environment of an optional flight tag obtaining method according to an embodiment of this application.

According to this embodiment of this application, a flight tag obtaining method is provided. The flight tag obtaining method may be applied to, but not limited to, an application environment shown in FIG. 1. A control terminal 104 obtains a takeoff geographic location of a first unmanned aerial vehicle (a unmanned aerial vehicle 102 as shown in FIG. 1) when the first unmanned aerial vehicle takes off, sends the takeoff geographic location to a server 106, and obtains a flight tag returned by the server 106, the flight tag being used for indicating whether the first unmanned aerial vehicle (the unmanned aerial vehicle 102 as shown in FIG. 1) is an unmanned aerial vehicle first taking off from the takeoff geographic location of the first unmanned aerial vehicle (the unmanned aerial vehicle 102 as shown in FIG. 1). Flight data (for example, the takeoff geographic location) of the unmanned aerial vehicle is sent to the server, to establish a common database of unmanned aerial vehicles on the server, to use the database to return the flight tag of the unmanned aerial vehicle to the control terminal, and further implement sharing of the foregoing flight tag of the unmanned aerial vehicle in social space (e.g., an online social space such as a social media network).

Optionally, in this embodiment, the foregoing control terminal may include but is not limited to at least one of the following: a mobile terminal, a wrist worn smart device, or a game controller. The mobile terminal may include but is not limited to at least one of the following: a mobile phone, a tablet computer, or a laptop computer. The foregoing is merely exemplary, and no limitation is set in this embodiment.

Optionally, in this embodiment, the foregoing terminal may, but not limited to, use a network to interact with the server. The foregoing network may include but is not limited to at least one of the following: a wide area network, a metropolitan area network, or a local area network. The foregoing terminal may, but not limited to, use wireless connection to perform data interaction with the unmanned aerial vehicle. The foregoing wireless connection may include but is not limited to at least one of the following: Bluetooth or WiFi. The foregoing is merely exemplary, and no limitation is set in this embodiment.

Figure 2:
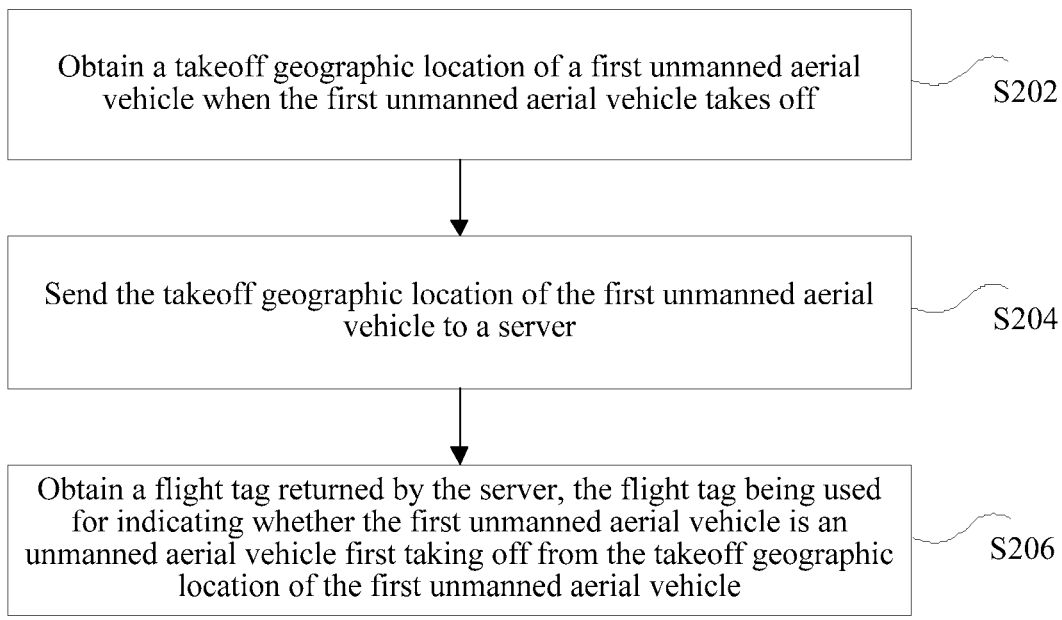
FIG. 2 is a flowchart of an optional flight tag obtaining method according to an embodiment of this application.

According to an embodiment of this application, a flight tag obtaining method is provided. As shown in FIG. 2, the method includes:

S202: Obtain a takeoff geographic location of a first unmanned aerial vehicle when the first unmanned aerial vehicle takes off.

S204: Send the takeoff geographic location of the first unmanned aerial vehicle to a server.

S206: Obtain a flight tag returned by the server, the flight tag being used for indicating whether the first unmanned aerial vehicle is an unmanned aerial vehicle first taking off from the takeoff geographic location of the first unmanned aerial vehicle.

Figure 3:
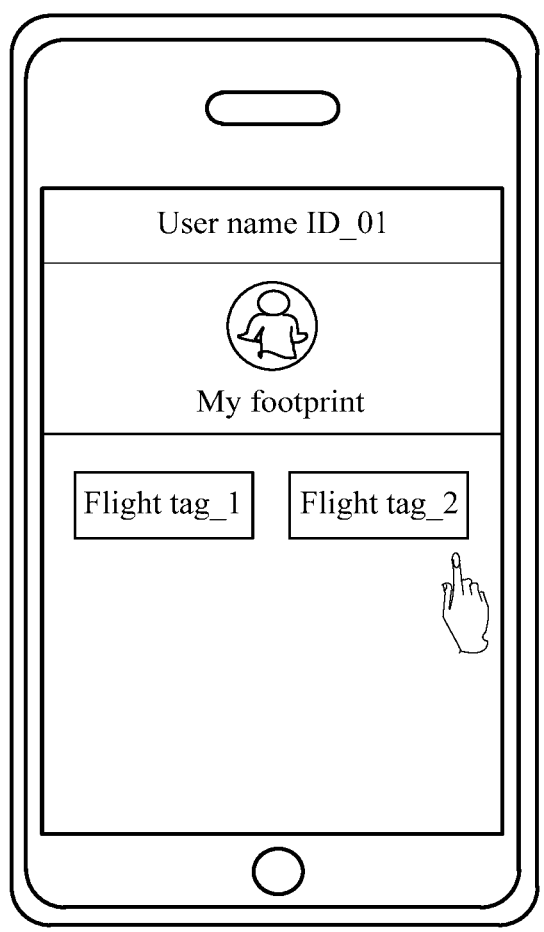
FIG. 3 is a schematic diagram of an optional flight tag obtaining method according to an embodiment of this application.

Optionally, in this embodiment, the foregoing flight tag obtaining method may be applied to, but not limited to, a process in which a client running on a control terminal obtains a flight tag of an unmanned aerial vehicle. The foregoing client running on the control terminal is configured to control takeoff of the unmanned aerial vehicle. For example, after an obtained takeoff geographic location of a first unmanned aerial vehicle when the first unmanned aerial vehicle takes off is sent to a server, a flight tag of the first unmanned aerial vehicle returned by the server is obtained. In addition, as shown in FIG. 3, the flight tags of the unmanned aerial vehicle returned by the server are displayed in the client (a user name is ID_01) running on the control terminal. For example, the flight tags returned by the server include a flight tag_1 and a flight tag_2. For example, the flight tags may be "occupying for a first time" or "flying across". The foregoing is merely exemplary, and no limitation is set in this embodiment.

It should be noted that, in this embodiment, a client running on a control terminal obtains a takeoff geographic location of a first unmanned aerial vehicle when the first unmanned aerial vehicle takes off; sends the takeoff geographic location to a server; and obtains a flight tag returned by the server, the flight tag being used for indicating whether the first unmanned aerial vehicle is an unmanned aerial vehicle first taking off from the takeoff geographic location of the first unmanned aerial vehicle. The takeoff geographic location obtained when the unmanned aerial vehicle takes off is sent to the server, so that the server establishes a common database of unmanned aerial vehicles on the server by using the obtained takeoff geographic location of the unmanned aerial vehicle. Further, the database is used for establishing interaction between the client running on the control terminal and the server, to implement sharing of the takeoff geographic location of the unmanned aerial vehicle, and return a flight tag corresponding to the unmanned aerial vehicle to the control terminal according to the takeoff geographic location of the unmanned aerial vehicle. Therefore, the foregoing flight tag of the unmanned aerial vehicle can be shared in social space of the client.

Optionally, in this embodiment, after the sending the takeoff geographic location of the first unmanned aerial vehicle to a server, and before the obtaining a flight tag returned by the server, the method further includes: determining, by the server, whether there is a takeoff geographic location in stored takeoff geographic locations that is the same as the received takeoff geographic location of the first unmanned aerial vehicle; and sending a corresponding flight tag according to a determining result. The flight tag may include but is not limited to at least one of the following: a first flight tag used for indicating that the first unmanned aerial vehicle is not an unmanned aerial vehicle first taking off from the takeoff geographic location of the first unmanned aerial vehicle, or a second flight tag used for indicating that the first unmanned aerial vehicle is an unmanned aerial vehicle first taking off from the takeoff geographic location of the first unmanned aerial vehicle.

Optionally, in this embodiment, the foregoing flight tag may further be used for, but not limited to, indicating at least one of the following: a geographic name corresponding to the takeoff geographic location of the first unmanned aerial vehicle, a takeoff date of the first unmanned aerial vehicle, or a takeoff time of the first unmanned aerial vehicle. For example, a first unmanned aerial vehicle is controlled by a client (a user name is ID_01) running on a control terminal. After the first unmanned aerial vehicle flies for a plurality of times, obtained flight tags displayed in the client may be shown in FIG. 4. Takeoff geographic locations included in a first flight tag (represented by using "occupying for a first time") are as follows: "Eiffel Tower, France (Sep. 24, 2015)", "Madrid, Spain (Jul. 17, 2015)", "Hokkaido, Japan (Jun. 4, 2015)", and "Paradise Island, the Maldives (Apr. 30, 2015)". Takeoff geographic locations included in a second flight tag (represented by using "flying across") are as follows: "Triumphal arch, France (Sep. 23, 2015)", "Barcelona, Spain (Jul. 19, 2015)", and "Tokyo, Japan (Jun. 6, 2015)".

Optionally, in this embodiment, the takeoff geographic location of the foregoing first unmanned aerial vehicle may include but is not limited to one of the following: 1) a geographic location of the first unmanned aerial vehicle when the first unmanned aerial vehicle takes off; or 2) a geographic location of the control terminal when the first unmanned aerial vehicle takes off. When the takeoff geographic location of the first unmanned aerial vehicle is the geographic location of the first unmanned aerial vehicle when the first unmanned aerial vehicle takes off, the takeoff geographic location may be obtained in, but is not limited to, at least one of the following manners: 1) The control terminal obtains the geographic location of the first unmanned aerial vehicle collected by the first unmanned aerial vehicle when the first unmanned aerial vehicle takes off; or 2) The control terminal obtains, by detection, the geographic location of the first unmanned aerial vehicle when the first unmanned aerial vehicle takes off.

Optionally, in this embodiment, the sending the takeoff geographic location of the first unmanned aerial vehicle to a server includes one of the following:

1) when the first unmanned aerial vehicle takes off, sending the takeoff geographic location of the first unmanned aerial vehicle to the server; or 2) after the first unmanned aerial vehicle takes off, sending the takeoff geographic location of the first unmanned aerial vehicle to the server.

It should be noted that, in manner 1) of this embodiment, the takeoff geographic location of the first unmanned aerial vehicle is sent to the server in real time when the first unmanned aerial vehicle takes off, so that the server can implement real-time comparison and real-time feedback, to ensure that the client running on the control terminal can obtain in time the flight tag matched to the first unmanned aerial vehicle, and the social space of the client can update and display the obtained flight tag in real time. Further, data recorded in the database of the server can further be updated in real time, to ensure the accuracy and update efficiency of the database, so that a plurality of users can invoke the data in the database at the same time, to implement the feasibility of multi-user interaction.

In addition, in manner 2) of this embodiment, the takeoff geographic location of the first unmanned aerial vehicle may alternatively be sent to the server after the first unmanned aerial vehicle takes off, so that the server is synchronized with the obtained takeoff geographic location of the first unmanned aerial vehicle after a time interval. A synchronization process in which the takeoff geographic location of the first unmanned aerial vehicle is sent to the server is separated, that is, a plurality of takeoff geographic locations obtained at particular time intervals is sent to the server together, to reduce a number of sending operations, and therefore improve the efficiency of sending the takeoff geographic locations to the server.

Optionally, in this embodiment, after the first unmanned aerial vehicle takes off, sending the takeoff geographic location of the first unmanned aerial vehicle to the server in manner 2) includes one of the following:

(1) after the first unmanned aerial vehicle takes off, obtaining a sending instruction, and sending, in response to the sending instruction, the takeoff geographic location of the first unmanned aerial vehicle to the server; or (2) after the first unmanned aerial vehicle takes off, determining whether a preset sending moment is reached, and when it is determined that the sending moment is reached, sending the takeoff geographic location of the first unmanned aerial vehicle to the server.

That is, after the first unmanned aerial vehicle takes off, the takeoff geographic location of the first unmanned aerial vehicle may be sent to the server in response to the obtained sending instruction, or the obtained takeoff geographic location of the first unmanned aerial vehicle may be sent to the server at the preset sending moment.

It should be noted that, in this embodiment, the foregoing sending instruction may be but is not limited to a sending instruction triggered by a user by means of an input operation. The input operation may include but is not limited to at least one of the following: clicking a predetermined trigger button, collecting predetermined voice, or obtaining a predetermined motion sensing gesture (or motion gesture).

In addition, in this embodiment, the foregoing preset sending moment may include but is not limited to at least one of the following: a moment satisfying a predetermined condition, or a preset cycle end moment. For example, the predetermined condition may be detecting a preconfigured network signal, such as a 4G network signal or a WiFi signal.

Figure 5:
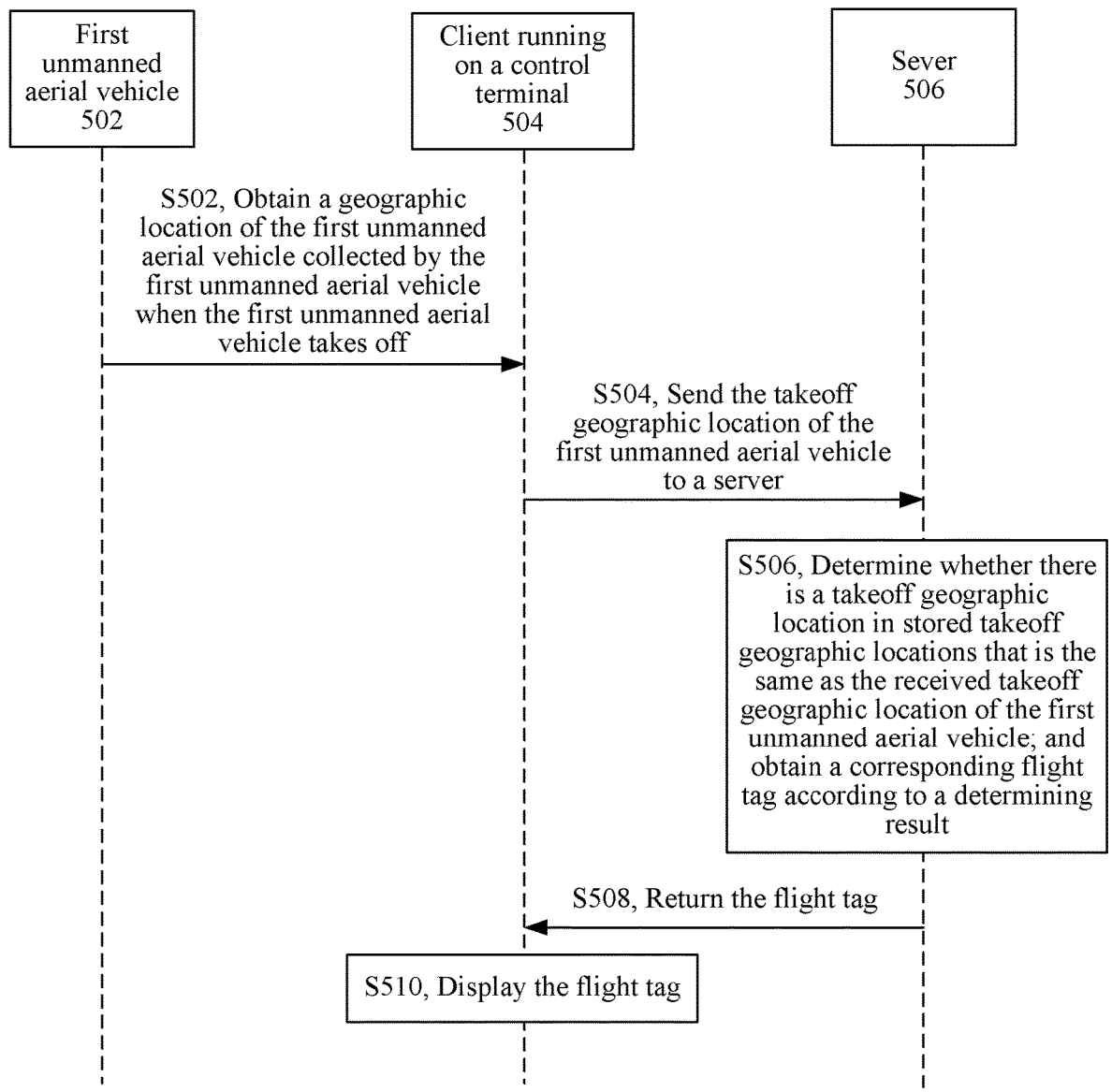
FIG. 5 is a flowchart of another optional flight tag obtaining method according to an embodiment of this application.

Specifically, descriptions are provided with reference to the following examples. As shown in FIG. 5, in the example, that a geographic location of a first unmanned aerial vehicle when the first unmanned aerial vehicle takes off is a takeoff geographic location of the first unmanned aerial vehicle is used as an example.

S502: A client 504 running on a control terminal obtains a geographic location of a first unmanned aerial vehicle collected by the first unmanned aerial vehicle 502 when the first unmanned aerial vehicle takes off.

S504: The client 504 running on the control terminal sends the takeoff geographic location of the first unmanned aerial vehicle to a server 506.

S506: The server 506 determines whether there is a takeoff geographic location in stored takeoff geographic locations that is the same as the received takeoff geographic location of the first unmanned aerial vehicle; and obtains a corresponding flight tag according to a determining result.

S508: The server 506 returns the flight tag to the client 504 running on the control terminal.

S510: The client 504 running on the control terminal displays the flight tag.

According to the embodiment provided in this application, the takeoff geographic location obtained when the unmanned aerial vehicle takes off is sent to the server, so that the server establishes a common database of unmanned aerial vehicles on the server by using the obtained takeoff geographic location of the unmanned aerial vehicle. Further, the database is used for establishing interaction between the client running on the control terminal and the server, to implement sharing of the takeoff geographic location of the unmanned aerial vehicle, and return the flight tag corresponding to the unmanned aerial vehicle to the control terminal according to the takeoff geographic location of the unmanned aerial vehicle. Therefore, the foregoing flight tag of the unmanned aerial vehicle can be shared in social space of the client, to resolve a technical problem that a flight tag of an unmanned aerial vehicle cannot be obtained by using the existing technology.

In an optional solution, the sending the takeoff geographic location of the first unmanned aerial vehicle to a server includes one of the following:

1) when the first unmanned aerial vehicle takes off, sending the takeoff geographic location of the first unmanned aerial vehicle to the server; or 2) after the first unmanned aerial vehicle takes off, sending the takeoff geographic location of the first unmanned aerial vehicle to the server.

It should be noted that, in this embodiment, the takeoff geographic location of the first unmanned aerial vehicle may be sent to the server when the first unmanned aerial vehicle takes off or after the first unmanned aerial vehicle takes off. That is, the takeoff geographic location may be sent to the server in real time, so that the server can implement real-time comparison and real-time feedback, to ensure that the client running on the control terminal can obtain in time the flight tag matched the first unmanned aerial vehicle, and the social space of the client can update and display the obtained flight tag in real time. Alternatively, the synchronization process may be separated, to first store a plurality of takeoff geographic locations obtained at particular time intervals, and then send the obtained takeoff geographic locations to the server together, to reduce a number of sending operations, and improve the efficiency of sending the takeoff geographic location to the server.

Optionally, in this embodiment, in manner 2), the foregoing takeoff geographic location of the first unmanned aerial vehicle may be first stored in the control terminal, or may be stored in another third-party storage medium. No limitation is set thereto in this embodiment.

According to the embodiment provided in this application, the takeoff geographic location of the first unmanned aerial vehicle is sent when the first unmanned aerial vehicle takes off or after the first unmanned aerial vehicle takes off, to select different sending moments according to different application scenarios, to ensure that the flight tag corresponding to the takeoff geographic location can be accurately obtained in time.

In an optional solution, the after the first unmanned aerial vehicle takes off, sending the takeoff geographic location of the first unmanned aerial vehicle to the server includes one of the following:

1) after the first unmanned aerial vehicle takes off, obtaining a sending instruction, and sending, in response to the sending instruction, the takeoff geographic location of the first unmanned aerial vehicle to the server; or 2) after the first unmanned aerial vehicle takes off, determining whether a preset sending moment is reached, and when it is determined that the sending moment is reached, sending the takeoff geographic location of the first unmanned aerial vehicle to the server.

Figure 6:
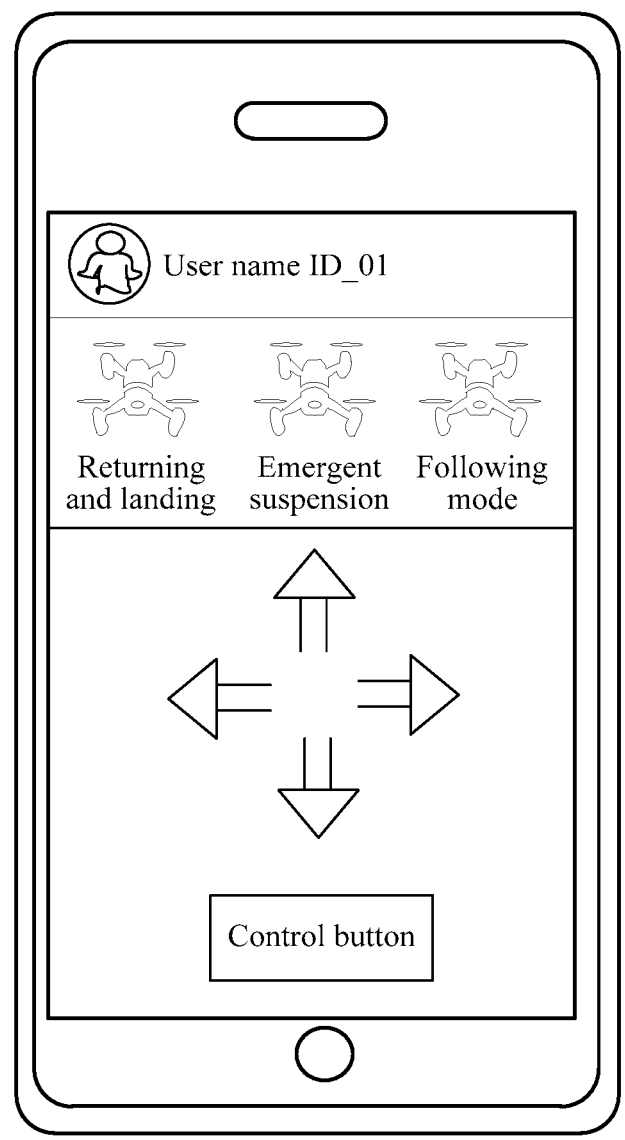
FIG. 6 is a schematic diagram of still another optional flight tag obtaining method according to an embodiment of this application.

Optionally, in this embodiment, after the first unmanned aerial vehicle takes off, the takeoff geographic location of the first unmanned aerial vehicle may be sent to the server in response to the obtained sending instruction. The foregoing sending instruction may be but is not limited to a sending instruction triggered by a user by means of an input operation. The input operation may include but is not limited to at least one of the following: clicking a predetermined trigger button, collecting predetermined voice, or obtaining a predetermined motion sensing gesture. For example, a control interface in which the client running on the control terminal controls the first unmanned aerial vehicle is shown in FIG. 6. The client can control the first unmanned aerial vehicle to perform different operations of "returning and landing", "emergent suspension", and "following mode", or control the first unmanned aerial vehicle to move according to directions indicated by arrows. In addition, the sending instruction of sending the takeoff geographic location of the first unmanned aerial vehicle to the server may alternatively be triggered by using a "control button" after the first unmanned aerial vehicle takes off (or when the first unmanned aerial vehicle takes off).

Optionally, in this embodiment, after the first unmanned aerial vehicle takes off, the obtained takeoff geographic location of the first unmanned aerial vehicle may alternatively be sent to the server at a preset sending moment. The foregoing preset sending moment may include but is not limited to at least one of the following: a moment satisfying a predetermined condition, or a preset cycle end moment. For example, the predetermined condition may be detecting a preconfigured network signal, such as a 4G network signal or a WiFi signal.

According to the embodiment provided in this application, the control terminal is triggered in different manners to send the takeoff geographic location of the first unmanned aerial vehicle to the server, to implement operation diversification and facilitate operations performed by a user, thereby improving the user experience.

In an optional solution, the obtaining a takeoff geographic location of a first unmanned aerial vehicle when the first unmanned aerial vehicle takes off includes one of the following:

S1: Obtain a geographic location of the first unmanned aerial vehicle when the first unmanned aerial vehicle takes off, the geographic location of the first unmanned aerial vehicle being used as the takeoff geographic location of the first unmanned aerial vehicle; or S2: Obtain a geographic location of a control terminal when the first unmanned aerial vehicle takes off, a client running on the control terminal controlling the takeoff of the first unmanned aerial vehicle; and use the geographic location of the control terminal as the takeoff geographic location of the first unmanned aerial vehicle.

Optionally, in this embodiment, the geographic location of the first unmanned aerial vehicle when the first unmanned aerial vehicle takes off may be obtained in, but is not limited to, at least one of the following manners: 1) The control terminal obtains the geographic location of the first unmanned aerial vehicle collected by the first unmanned aerial vehicle when the first unmanned aerial vehicle takes off; or 2) The control terminal obtains, by detection, the geographic location of the first unmanned aerial vehicle when the first unmanned aerial vehicle takes off.

According to the embodiment provided in this application, the client running on the control terminal can obtain the takeoff geographic location of the first unmanned aerial vehicle collected by the first unmanned aerial vehicle when the first unmanned aerial vehicle takes off, or can obtain, by self detection, the takeoff geographic location of the first unmanned aerial vehicle when the first unmanned aerial vehicle takes off. The takeoff geographic location of the first unmanned aerial vehicle is obtained in different manners, to satisfy actual requirements of different users, and ensure the accuracy of the obtained flight tag.

In an optional solution, after the obtaining a flight tag returned by the server, the method further includes:

S1: Display the flight tag in a client running on a control terminal, the client controlling the takeoff of the first unmanned aerial vehicle, and the flight tag further being used for indicating at least one of the following: a geographic name corresponding to the takeoff geographic location of the first unmanned aerial vehicle, a takeoff date of the first unmanned aerial vehicle, or a takeoff time of the first unmanned aerial vehicle.

Optionally, in this embodiment, the foregoing flight tag may include but is not limited to at least one of the following: a first flight tag used for indicating that the first unmanned aerial vehicle is not an unmanned aerial vehicle first taking off from the takeoff geographic location of the first unmanned aerial vehicle, or a second flight tag used for indicating that the first unmanned aerial vehicle is an unmanned aerial vehicle first taking off from the takeoff geographic location of the first unmanned aerial vehicle. In addition, the foregoing flight tag may further be but is not limited to being used for indicating at least one of the following: a geographic name (for example, a location name) corresponding to the takeoff geographic location (for example, a location coordinate) of the first unmanned aerial vehicle, a takeoff date of the first unmanned aerial vehicle, or a takeoff time of the first unmanned aerial vehicle.

Figure 4:
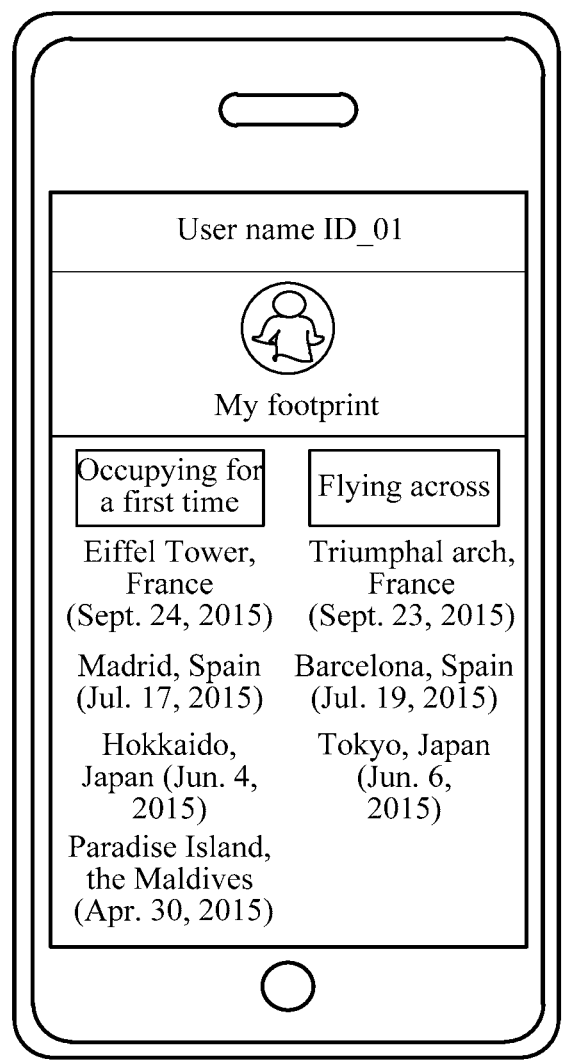
FIG. 4 is a schematic diagram of another optional flight tag obtaining method according to an embodiment of this application.

Specifically, descriptions are provided with reference to FIG. 4. The flight tags obtained after the first unmanned aerial vehicle flies for a plurality of times can be displayed in the client running on the control terminal. For example, takeoff geographic locations included in a first flight tag (represented by using "occupying for a first time") are as follows: "Eiffel Tower, France (Sep. 24, 2015)", "Madrid, Spain (Jul. 17, 2015)", "Hokkaido, Japan (Jun. 4, 2015)", and "Paradise Island, the Maldives (Apr. 30, 2015)"; and takeoff geographic locations included in a second flight tag (represented by "flying across") are as follows: "Triumphal arch, France (Sep. 23, 2015)", "Barcelona, Spain (Jul. 19, 2015)", and "Tokyo, Japan (Jun. 6, 2015)".

According to the embodiment provided in this application, the obtained flight tag is displayed in the client running on the control terminal, so that different users can share the flight tag in social space, and share different flying experiences by using the flight tag, thereby satisfying different actual requirements of the different users.

In an optional solution, after the sending the takeoff geographic location of the first unmanned aerial vehicle to a server, and before the obtaining a flight tag returned by the server, the method further includes:

S1: The server receives the takeoff geographic location.

S2: The server determines whether there is a takeoff geographic location in stored takeoff geographic locations that is the same as the takeoff geographic location of the first unmanned aerial vehicle.

S3: If yes, the server sends a first flight tag, the first flight tag being used for indicating that the first unmanned aerial vehicle is not an unmanned aerial vehicle first taking off from the takeoff geographic location of the first unmanned aerial vehicle, and the flight tag including the first flight tag.

S3: If no, the server sends a second flight tag, the second flight tag being used for indicating that the first unmanned aerial vehicle is an unmanned aerial vehicle first taking off from the takeoff geographic location of the first unmanned aerial vehicle, and the flight tag including the second flight tag.

Optionally, in this embodiment, the foregoing server compares stored takeoff geographic locations with the takeoff geographic location of the first unmanned aerial vehicle, to determine whether there is a takeoff geographic location in a database established in the server that is the same as the takeoff geographic location of the first unmanned aerial vehicle, to send different flight tags according to a determining result. Therefore, it is ensured that the client running on the control terminal obtains an accurate flight tag.

Optionally, in this embodiment, the determining whether there is a takeoff geographic location in stored takeoff geographic locations that is the same as the takeoff geographic location of the first unmanned aerial vehicle includes at least one of the following:

1) determining whether location information of the takeoff geographic location of the first unmanned aerial vehicle is consistent with location information of the stored takeoff geographic locations; or 2) determining whether region indication information in location information of the takeoff geographic location of the first unmanned aerial vehicle is consistent with region indication information in location information of the stored takeoff geographic locations, the region indication information being a part of the location information.

That is, a principle for determining a same takeoff geographic location may include but is not limited to at least one of the following: the location information is completely consistent, or the region indication information (a part of the location information) used for indicating a region in which the first unmanned aerial vehicle is located is consistent.

Optionally, in this embodiment, that the first flight tag is sent to a client includes: obtaining a geographic name corresponding to the takeoff geographic location of the first unmanned aerial vehicle, and sending the first flight tag at least including the geographic name; that the second flight tag is sent to a client includes: obtaining a geographic name corresponding to the takeoff geographic location of the first unmanned aerial vehicle, storing a correspondence between the takeoff geographic location of the first unmanned aerial vehicle and the obtained geographic name, and sending the second flight tag at least including the geographic name.

Optionally, in this embodiment, the foregoing server may, but is not limited to, adjust (e.g., update), according to the obtained takeoff geographic location of the unmanned aerial vehicle, the takeoff geographic locations stored in the database of the server. For example, the obtained takeoff geographic location of the unmanned aerial vehicle can be included in the takeoff geographic locations stored in the database of the server. Specifically, when the second flight tag used for indicating that the first unmanned aerial vehicle is an unmanned aerial vehicle first taking off from the takeoff geographic location of the first unmanned aerial vehicle is obtained, the geographic name corresponding to the takeoff geographic location of the first unmanned aerial vehicle is obtained, and the correspondence between the takeoff geographic location of the first unmanned aerial vehicle and the obtained geographic name is stored, to newly add a takeoff geographic location to the database.

According to the embodiment provided in this application, the takeoff geographic location obtained when the unmanned aerial vehicle takes off is sent to the server, so that the server establishes a common database of unmanned aerial vehicles on the server by using the obtained takeoff geographic location of the unmanned aerial vehicle. Further, the database is used for establishing interaction between the client running on the control terminal and the server, to implement sharing of the takeoff geographic location of the unmanned aerial vehicle, and return the flight tag corresponding to the unmanned aerial vehicle to the control terminal according to the takeoff geographic location of the unmanned aerial vehicle. Therefore, the foregoing flight tag of the unmanned aerial vehicle can be shared in social space of the client.

It should be noted that, to simplify the description, the foregoing method embodiments are described as a series of action combination. But persons skilled in the art should know that this application is not limited to any described order of the action, as some steps can adopt other orders or can be performed simultaneously according to this application. Secondarily, persons skilled in the art should know that the embodiments described in the specification belong to exemplary embodiments and not all the involved actions and modules are necessary for this application.

Through the descriptions of the preceding embodiments, persons skilled in the art may understand that the methods according to the foregoing embodiments may be implemented by software and a universal hardware platform, and certainly may also be implemented by hardware. Based on such an understanding, the technical solutions of this application or the part that makes contributions to the existing technology may be substantially embodied in the form of a software product. The computer software product is stored in a storage medium (for example, a ROM/RAM, a magnetic disk, or an optical disc), and contains instructions for instructing a terminal device (which may be a mobile phone, a computer, a server, or a network device) to perform functions of the embodiments of this application.

Embodiment 2

Figure 7:
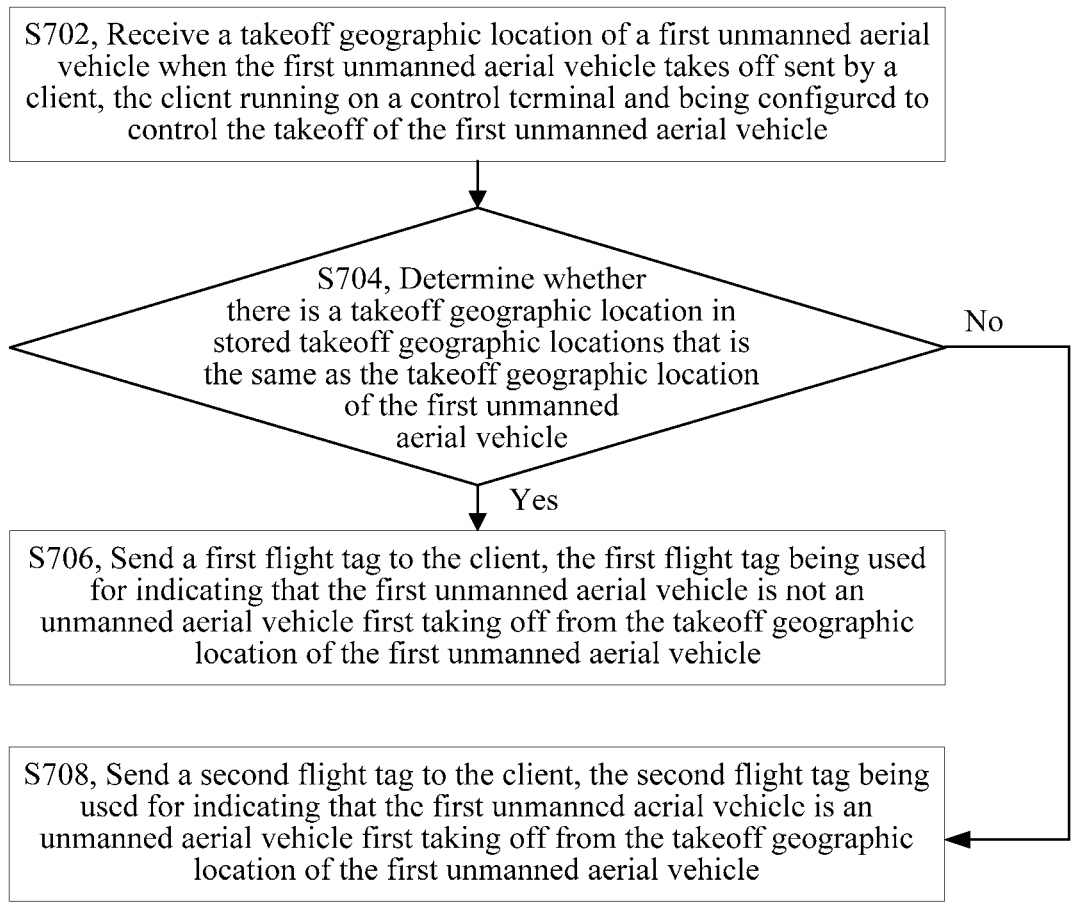
FIG. 7 is a flowchart of still another optional flight tag obtaining method according to an embodiment of this application.

According to this embodiment of this application, a flight tag obtaining method is further provided. As shown in FIG. 7, the method includes:

S702: Receive a takeoff geographic location of a first unmanned aerial vehicle when the first unmanned aerial vehicle takes off sent by a client, the client running on a control terminal and being configured to control the takeoff of the first unmanned aerial vehicle.

S704: Determine whether there is a takeoff geographic location in stored takeoff geographic locations that is the same as the takeoff geographic location of the first unmanned aerial vehicle.

S706: If yes, send a first flight tag to the client, the first flight tag being used for indicating that the first unmanned aerial vehicle is not an unmanned aerial vehicle first taking off from the takeoff geographic location of the first unmanned aerial vehicle.

S708: If no, send a second flight tag to the client, the second flight tag being used for indicating that the first unmanned aerial vehicle is an unmanned aerial vehicle first taking off from the takeoff geographic location of the first unmanned aerial vehicle.

Optionally, in this embodiment, the foregoing flight tag obtaining method may be applied to, but not limited to, a process in which a client running on a control terminal obtains a flight tag of an unmanned aerial vehicle. The foregoing client running on the control terminal is configured to control takeoff of the unmanned aerial vehicle. For example, after receiving the takeoff geographic location of the first unmanned aerial vehicle when the first unmanned aerial vehicle takes off sent by the client, a server determines whether there is a takeoff geographic location in stored takeoff geographic locations that is the same as the takeoff geographic location of the first unmanned aerial vehicle, to send different first flight tags or second flight tags to the client according to different determining results, the client running on the control terminal and being configured to control the takeoff of the first unmanned aerial vehicle. As shown in FIG. 3, the flight tag of the unmanned aerial vehicle returned by the server is displayed in the client (a user name is ID_01) running on the control terminal. For example, the flight tags returned by the server include a flight tag_1 and a flight tag_2. For example, the flight tags may be "occupying for a first time" or "flying across". The foregoing is merely exemplary, and no limitation is set in this embodiment.

It should be noted that, in this embodiment, the server receives a takeoff geographic location of a first unmanned aerial vehicle when the first unmanned aerial vehicle takes off sent by a client, the client running on a control terminal and being configured to control the takeoff of the first unmanned aerial vehicle; determines whether there is a takeoff geographic location in stored takeoff geographic locations that is the same as the takeoff geographic location of the first unmanned aerial vehicle; and if yes, sends a first flight tag to the client, the first flight tag being used for indicating that the first unmanned aerial vehicle is not an unmanned aerial vehicle first taking off from the takeoff geographic location of the first unmanned aerial vehicle; or if no, sends a second flight tag to the client, the second flight tag being used for indicating that the first unmanned aerial vehicle is an unmanned aerial vehicle first taking off from the takeoff geographic location of the first unmanned aerial vehicle, and the flight tag being used for indicating whether the first unmanned aerial vehicle is an unmanned aerial vehicle first taking off from the takeoff geographic location of the first unmanned aerial vehicle. The server obtains a corresponding flight tag according to the obtained takeoff geographic location, and sends the flight tag to the client, so that the server establishes a common database of unmanned aerial vehicles on the server by using the obtained takeoff geographic location of the unmanned aerial vehicle. Further, interaction is established between the client running on the control terminal and the server by using the database, to implement sharing of the takeoff geographic location of the unmanned aerial vehicle, and return the flight tag corresponding to the unmanned aerial vehicle to the control terminal according to the takeoff geographic location of the unmanned aerial vehicle. Therefore, the foregoing flight tag of the unmanned aerial vehicle can be shared in social space of the client.

Optionally, in this embodiment, the flight tag may include but is not limited to at least one of the following: a first flight tag used for indicating that the first unmanned aerial vehicle is not an unmanned aerial vehicle first taking off from the takeoff geographic location of the first unmanned aerial vehicle, or a second flight tag used for indicating that the first unmanned aerial vehicle is an unmanned aerial vehicle first taking off from the takeoff geographic location of the first unmanned aerial vehicle.

Optionally, in this embodiment, the foregoing flight tag may further be but is not limited to being used for indicating at least one of the following: a geographic name corresponding to the takeoff geographic location of the first unmanned aerial vehicle, a takeoff date of the first unmanned aerial vehicle, or a takeoff time of the first unmanned aerial vehicle. For example, a first unmanned aerial vehicle is controlled by a client (a user name is ID_01) running on a control terminal. After the first unmanned aerial vehicle flies for a plurality of times, an obtained flight tag displayed in the client may be shown in FIG. 4. Takeoff geographic locations included in a first flight tag (represented by using "occupying for a first time") are as follows: "Eiffel Tower, France (Sep. 24, 2015)", "Madrid, Spain (Jul. 17, 2015)", "Hokkaido, Japan (Jun. 4, 2015)", and "Paradise Island, the Maldives (Apr. 30, 2015)". Takeoff geographic locations included in a second flight tag (represented by using "flying across") are as follows: "Triumphal arch, France (Sep. 23, 2015)", "Barcelona, Spain (Jul. 19, 2015)", and "Tokyo, Japan (Jun. 6, 2015)".

Optionally, in this embodiment, the takeoff geographic location of the foregoing first unmanned aerial vehicle may include but is not limited to one of the following: 1) a geographic location of the first unmanned aerial vehicle when the first unmanned aerial vehicle takes off; or 2) a geographic location of the control terminal when the first unmanned aerial vehicle takes off. When the takeoff geographic location of the first unmanned aerial vehicle is the geographic location of the first unmanned aerial vehicle when the first unmanned aerial vehicle takes off, the takeoff geographic location may be obtained in, but is not limited to, at least one of the following manners: 1) The control terminal obtains the geographic location of the first unmanned aerial vehicle collected by the first unmanned aerial vehicle when the first unmanned aerial vehicle takes off; or 2) The control terminal obtains, by detection, the geographic location of the first unmanned aerial vehicle when the first unmanned aerial vehicle takes off.

Optionally, in this embodiment, the determining whether there is a takeoff geographic location in stored takeoff geographic locations that is the same as the takeoff geographic location of the first unmanned aerial vehicle includes at least one of the following:

1) determining whether location information of the takeoff geographic location of the first unmanned aerial vehicle is consistent with location information of the stored takeoff geographic locations; or 2) determining whether region indication information in location information of the takeoff geographic location of the first unmanned aerial vehicle is consistent with region indication information in location information of the stored takeoff geographic locations, the region indication information being a part of the location information.

That is, a principle for determining a same takeoff geographic location may include but is not limited to at least one of the following: the location information is completely consistent, or the region indication information (a part of the location information) used for indicating a region in which the first unmanned aerial vehicle is located is consistent.

Optionally, in this embodiment, that the first flight tag is sent to a client includes: obtaining a geographic name corresponding to the takeoff geographic location of the first unmanned aerial vehicle, and sending the first flight tag at least including the geographic name; that the second flight tag is sent to a client includes: obtaining a geographic name corresponding to the takeoff geographic location of the first unmanned aerial vehicle, storing a correspondence between the takeoff geographic location of the first unmanned aerial vehicle and the obtained geographic name, and sending the second flight tag at least including the geographic name.

Optionally, in this embodiment, the foregoing server may adjust, but is not limited to, adjusting, according to the obtained takeoff geographic location of the unmanned aerial vehicle, the takeoff geographic locations stored in the database of the server. Specifically, when the second flight tag used for indicating that the first unmanned aerial vehicle is an unmanned aerial vehicle first taking off from the takeoff geographic location of the first unmanned aerial vehicle is obtained, the geographic name corresponding to the takeoff geographic location of the first unmanned aerial vehicle is obtained, and the correspondence between the takeoff geographic location of the first unmanned aerial vehicle and the obtained geographic name is stored, to newly add a takeoff geographic location to the database.

According to the embodiment provided in this embodiment, the server obtains a corresponding flight tag according to the obtained takeoff geographic location, and sends the flight tag to the client, so that the server establishes a common database of unmanned aerial vehicles on the server by using the obtained takeoff geographic location of the unmanned aerial vehicle. Further, interaction is established between the client running on the control terminal and the server by using the database, to implement sharing of the takeoff geographic location of the unmanned aerial vehicle, and return the flight tag corresponding to the unmanned aerial vehicle to the control terminal according to the takeoff geographic location of the unmanned aerial vehicle. Therefore, the foregoing flight tag of the unmanned aerial vehicle can be shared in social space of the client.

In an optional solution, the determining whether there is a takeoff geographic location in stored takeoff geographic locations that is the same as the takeoff geographic location of the first unmanned aerial vehicle includes at least one of the following:

1) determining whether location information of the takeoff geographic location of the first unmanned aerial vehicle is consistent with location information of the stored takeoff geographic locations; or 2) determining whether region indication information in location information of the takeoff geographic location of the first unmanned aerial vehicle is consistent with region indication information in location information of the stored takeoff geographic locations, the region indication information being a part of the location information.

That is, a principle for determining a same takeoff geographic location may include but is not limited to at least one of the following: the location information is completely consistent, or the region indication information (a part of the location information) used for indicating a region in which the first unmanned aerial vehicle is located is consistent.

In an optional solution, 1) the sending a first flight tag to the client includes: obtaining a geographic name corresponding to the takeoff geographic location of the first unmanned aerial vehicle, and sending the first flight tag at least including the geographic name; and 2) the sending a second flight tag to the client includes: obtaining a geographic name corresponding to the takeoff geographic location of the first unmanned aerial vehicle, storing a correspondence between the takeoff geographic location of the first unmanned aerial vehicle and the obtained geographic name, and sending the second flight tag at least including the geographic name.

Optionally, in this embodiment, the foregoing server may adjust, but is not limited to, adjusting, according to the obtained takeoff geographic location of the unmanned aerial vehicle, the takeoff geographic locations stored in the database of the server. Specifically, when the second flight tag used for indicating that the first unmanned aerial vehicle is an unmanned aerial vehicle first taking off from the takeoff geographic location of the first unmanned aerial vehicle is obtained, the geographic name corresponding to the takeoff geographic location of the first unmanned aerial vehicle is obtained, and the correspondence between the takeoff geographic location of the first unmanned aerial vehicle and the obtained geographic name is stored, to newly add a takeoff geographic location to the database.

It should be noted that, to simplify the description, the foregoing method embodiments are described as a series of action combination. But persons skilled in the art should know that this application is not limited to any described sequence of the action, as some steps can adopt other sequences or can be performed simultaneously according to this application. Secondarily, persons skilled in the art should know that the embodiments described in the specification belong to exemplary embodiments and the involved actions and not all modules are necessary for this application.

Through the descriptions of the preceding embodiments, persons skilled in the art may understand that the methods according to the foregoing embodiments may be implemented by software and a universal hardware platform, and certainly may also be implemented by hardware. Based on such an understanding, the technical solutions of this application or the part that makes contributions to the existing technology may be substantially embodied in the form of a software product. The computer software product is stored in a storage medium (for example, a ROM/RAM, a magnetic disk, or an optical disc), and contains several instructions for instructing a terminal device (which may be a mobile phone, a computer, a server, or a network device) to execute the apparatus according to the embodiments of this application.

Embodiment 3

Figure 8:
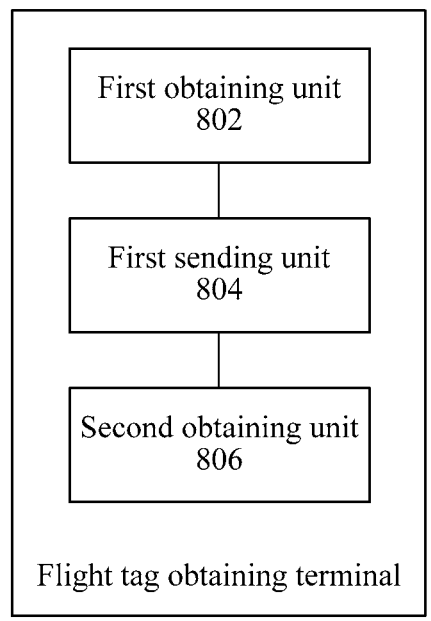
FIG. 8 is a schematic diagram of an optional flight tag obtaining terminal according to an embodiment of this application.

According to this embodiment of this application, a flight tag obtaining terminal is provided. As shown in FIG. 8, the terminal includes:

1) a first obtaining unit 802, configured to obtain a takeoff geographic location of a first unmanned aerial vehicle when the first unmanned aerial vehicle takes off;

2) a first sending unit 804, configured to send the takeoff geographic location of the first unmanned aerial vehicle to a server; and 3) a second obtaining unit 806, configured to obtain a flight tag returned by the server, the flight tag being used for indicating whether the first unmanned aerial vehicle is an unmanned aerial vehicle first taking off from the takeoff geographic location of the first unmanned aerial vehicle.

Optionally, in this embodiment, the foregoing flight tag obtaining terminal may be but is not limited to being applied to a process in which a client running on a control terminal obtains a flight tag of an unmanned aerial vehicle. The foregoing client running on the control terminal is configured to control takeoff of the unmanned aerial vehicle. For example, after an obtained takeoff geographic location of a first unmanned aerial vehicle when the first unmanned aerial vehicle takes off is sent to a server, a flight tag of the first unmanned aerial vehicle returned by the server is obtained. In addition, as shown in FIG. 3, the flight tag of the unmanned aerial vehicle returned by the server is displayed in the client (a user name is ID_01) running on the control terminal. For example, the flight tags returned by the server include a flight tag_1 and a flight tag_2. For example, the flight tags may be "occupying for a first time" or "flying across". The foregoing is merely exemplary, and no limitation is set in this embodiment.

It should be noted that, in this embodiment, a client running on a control terminal obtains a takeoff geographic location of a first unmanned aerial vehicle when the first unmanned aerial vehicle takes off; sends the takeoff geographic location to a server; and obtains a flight tag returned by the server, the flight tag being used for indicating whether the first unmanned aerial vehicle is an unmanned aerial vehicle first taking off from the takeoff geographic location of the first unmanned aerial vehicle. The takeoff geographic location obtained when the unmanned aerial vehicle takes off is sent to the server, so that the server establishes a common database of unmanned aerial vehicles on the server by using the obtained takeoff geographic location of the unmanned aerial vehicle. Further, the database is used for establishing interaction between the client running on the control terminal and the server, to implement sharing of the takeoff geographic location of the unmanned aerial vehicle, and return the flight tag corresponding to the unmanned aerial vehicle to the control terminal according to the takeoff geographic location of the unmanned aerial vehicle. Therefore, the foregoing flight tag of the unmanned aerial vehicle can be shared in social space of the client.

Optionally, in this embodiment, after the sending the takeoff geographic location of the first unmanned aerial vehicle to a server, and before the obtaining a flight tag returned by the server, the method further includes: determining, by the server, whether there is a takeoff geographic location in stored takeoff geographic locations that is the same as the received takeoff geographic location of the first unmanned aerial vehicle; and sending a corresponding flight tag according to a determining result. The flight tag may include but is not limited to at least one of the following: a first flight tag used for indicating that the first unmanned aerial vehicle is not an unmanned aerial vehicle first taking off from the takeoff geographic location of the first unmanned aerial vehicle, or a second flight tag used for indicating that the first unmanned aerial vehicle is an unmanned aerial vehicle first taking off from the takeoff geographic location of the first unmanned aerial vehicle.

Optionally, in this embodiment, the foregoing flight tag may further be but is not limited to being used for indicating at least one of the following: a geographic name corresponding to the takeoff geographic location of the first unmanned aerial vehicle, a takeoff date of the first unmanned aerial vehicle, or a takeoff time of the first unmanned aerial vehicle. For example, a first unmanned aerial vehicle is controlled by a client (a user name is ID_01) running on a control terminal. After the first unmanned aerial vehicle flies for a plurality of times, an obtained flight tag displayed in the client may be shown in FIG. 4. Takeoff geographic locations included in a first flight tag (represented by using "occupying for a first time") are as follows: "Eiffel Tower, France (Sep. 24, 2015)", "Madrid, Spain (Jul. 17, 2015)", "Hokkaido, Japan (Jun. 4, 2015)", and "Paradise Island, the Maldives (Apr. 30, 2015)". Takeoff geographic locations included in a second flight tag (represented by using "flying across") are as follows: "Triumphal arch, France (Sep. 23, 2015)", "Barcelona, Spain (Jul. 19, 2015)", and "Tokyo, Japan (Jun. 6, 2015)".

Optionally, in this embodiment, the takeoff geographic location of the foregoing first unmanned aerial vehicle may include but is not limited to one of the following: 1) a geographic location of the first unmanned aerial vehicle when the first unmanned aerial vehicle takes off; or 2) a geographic location of the control terminal when the first unmanned aerial vehicle takes off. When the takeoff geographic location of the first unmanned aerial vehicle is the geographic location of the first unmanned aerial vehicle when the first unmanned aerial vehicle takes off, the takeoff geographic location may be obtained in, but is not limited to, at least one of the following manners: 1) The control terminal obtains the geographic location of the first unmanned aerial vehicle collected by the first unmanned aerial vehicle when the first unmanned aerial vehicle takes off; or 2) The control terminal obtains, by detection, the geographic location of the first unmanned aerial vehicle when the first unmanned aerial vehicle takes off.

Optionally, in this embodiment, the sending the takeoff geographic location of the first unmanned aerial vehicle to a server includes one of the following:

1) when the first unmanned aerial vehicle takes off, sending the takeoff geographic location of the first unmanned aerial vehicle to the server; or 2) after the first unmanned aerial vehicle takes off, sending the takeoff geographic location of the first unmanned aerial vehicle to the server.

It should be noted that, in manner 1) of this embodiment, the takeoff geographic location of the first unmanned aerial vehicle is sent to the server in real time when the first unmanned aerial vehicle takes off, so that the server can implement real-time comparison and real-time feedback, to ensure that the client running on the control terminal can obtain in time the flight tag matched the first unmanned aerial vehicle, and the social space of the client can update and display the obtained flight tag in real time. Further, data recorded in the database of the server can further be updated in real time, to ensure the accuracy and update efficiency of the database, so that a plurality of users can invoke the data in the database at the same time, to implement the feasibility of multi-user interaction.

In addition, in manner 2) of this embodiment, the takeoff geographic location of the first unmanned aerial vehicle may alternatively be sent to the server after the first unmanned aerial vehicle takes off, so that the server is synchronized with the obtained takeoff geographic location of the first unmanned aerial vehicle after a time interval. A synchronization process in which the takeoff geographic location of the first unmanned aerial vehicle is sent to the server is separated, that is, a plurality of takeoff geographic locations obtained at particular time intervals is sent to the server together, to reduce a number of sending operations, and therefore improve the efficiency of sending the takeoff geographic location to the server.

Optionally, in this embodiment, the after the first unmanned aerial vehicle takes off, sending the takeoff geographic location of the first unmanned aerial vehicle to the server in manner 2) includes one of the following:

(1) after the first unmanned aerial vehicle takes off, obtaining a sending instruction, and sending, in response to the sending instruction, the takeoff geographic location of the first unmanned aerial vehicle to the server; or (2) after the first unmanned aerial vehicle takes off, determining whether a preset sending moment is reached, and when it is determined that the sending moment is reached, sending the takeoff geographic location of the first unmanned aerial vehicle to the server.

That is, after the first unmanned aerial vehicle takes off, the takeoff geographic location of the first unmanned aerial vehicle may be sent to the server in response to the obtained sending instruction, or the obtained takeoff geographic location of the first unmanned aerial vehicle may be sent to the server at the preset sending moment.

It should be noted that, in this embodiment, the foregoing sending instruction may be but is not limited to a sending instruction triggered by a user by means of an input operation. The input operation may include but is not limited to at least one of the following: clicking a predetermined trigger button, collecting predetermined voice, or obtaining a predetermined motion sensing gesture.

In addition, in this embodiment, the foregoing preset sending moment may include but is not limited to at least one of the following: a moment satisfying a predetermined condition, or a preset cycle end moment. For example, the predetermined condition may be detecting a preconfigured network signal, such as a 4G network signal or a WiFi signal.

Specifically, descriptions are provided with reference to the following examples. As shown in FIG. 5, in the example, that a geographic location of a first unmanned aerial vehicle when the first unmanned aerial vehicle takes off is a takeoff geographic location of the first unmanned aerial vehicle is used as an example.

S502: A client 504 running on a control terminal obtains a geographic location of a first unmanned aerial vehicle collected by the first unmanned aerial vehicle 502 when the first unmanned aerial vehicle takes off.

S504: The client 504 running on the control terminal sends the takeoff geographic location of the first unmanned aerial vehicle to the server 506.

S506: The server 506 determines whether there is a takeoff geographic location in stored takeoff geographic locations that is the same as the received takeoff geographic location of the first unmanned aerial vehicle; and obtains a corresponding flight tag according to a determining result.

S508: The server 506 returns the flight tag to the client 504 running on the control terminal.

S510: The client 504 running on the control terminal displays the flight tag.

According to the embodiment provided in this application, the takeoff geographic location obtained when the unmanned aerial vehicle takes off is sent to the server, so that the server establishes a common database of unmanned aerial vehicles on the server by using the obtained takeoff geographic location of the unmanned aerial vehicle. Further, the database is used for establishing interaction between the client running on the control terminal and the server, to implement sharing of the takeoff geographic location of the unmanned aerial vehicle, and return the flight tag corresponding to the unmanned aerial vehicle to the control terminal according to the takeoff geographic location of the unmanned aerial vehicle. Therefore, the foregoing flight tag of the unmanned aerial vehicle can be shared in social space of the client, to resolve a technical problem that a flight tag of an unmanned aerial vehicle cannot be obtained by using the existing technology.

In an optional solution, the first sending unit 804 includes one of the following:

1) a first sending module, configured to: when the first unmanned aerial vehicle takes off, send the takeoff geographic location of the first unmanned aerial vehicle to the server; or 2) a second sending module, configured to: after the first unmanned aerial vehicle takes off, send the takeoff geographic location of the first unmanned aerial vehicle to the server.

It should be noted that, in this embodiment, the takeoff geographic location of the first unmanned aerial vehicle may be sent to the server when the first unmanned aerial vehicle takes off or after the first unmanned aerial vehicle takes off. That is, the takeoff geographic location may be sent to the server in real time, so that the server can implement real-time comparison and real-time feedback, to ensure that the client running on the control terminal can obtain in time the flight tag matched the first unmanned aerial vehicle, and the social space of the client can update and display the obtained flight tag in real time. Alternatively, the synchronization process may be separated, to first store a plurality of takeoff geographic locations obtained at particular time intervals, and then send the obtained takeoff geographic locations to the server together, to reduce a number of sending operations, and improve the efficiency of sending the takeoff geographic location to the server.

Optionally, in this embodiment, in manner 2), the foregoing takeoff geographic location of the first unmanned aerial vehicle may be first stored in the control terminal, or may be stored in another third-party storage medium. No limitation is set thereto in this embodiment.

According to the embodiment provided in this application, the takeoff geographic location of the first unmanned aerial vehicle is sent when the first unmanned aerial vehicle takes off or after the first unmanned aerial vehicle takes off, to select different sending moments according to different application scenarios, to ensure that the flight tag corresponding to the takeoff geographic location can be accurately obtained in time.

In an optional solution, the second sending module includes one of the following:

(1) a first sending submodule, configured to: after the first unmanned aerial vehicle takes off, obtain a sending instruction, and send, in response to the sending instruction, the takeoff geographic location of the first unmanned aerial vehicle to the server; or 2) a second sending submodule, configured to: after the first unmanned aerial vehicle takes off, determine whether a preset sending moment is reached, and when it is determined that the sending moment is reached, send the takeoff geographic location of the first unmanned aerial vehicle to the server.

Optionally, in this embodiment, after the first unmanned aerial vehicle takes off, the takeoff geographic location of the first unmanned aerial vehicle may be sent to the server in response to the obtained sending instruction. The foregoing sending instruction may be but is not limited to a sending instruction triggered by a user by means of an input operation. The input operation may include but is not limited to at least one of the following: clicking a predetermined trigger button, collecting predetermined voice, or obtaining a predetermined motion sensing gesture. For example, a control interface in which the client running on the control terminal controls the first unmanned aerial vehicle is shown in FIG. 6. The client can control the first unmanned aerial vehicle to perform different operations of "returning and landing", "emergent suspension", and "following mode", or control the first unmanned aerial vehicle to move according to directions indicated by arrows. In addition, the sending instruction of sending the takeoff geographic location of the first unmanned aerial vehicle to the server may alternatively be triggered by using a "control button" after the first unmanned aerial vehicle takes off (or when the first unmanned aerial vehicle takes off).

Optionally, in this embodiment, after the first unmanned aerial vehicle takes off, the obtained takeoff geographic location of the first unmanned aerial vehicle may alternatively be sent to the server at a preset sending moment. The foregoing preset sending moment may include but is not limited to at least one of the following: a moment satisfying a predetermined condition, or a preset cycle end moment. For example, the predetermined condition may be detecting a preconfigured network signal, such as a 4G network signal or a WiFi signal.

According to the embodiment provided in this application, the control terminal is triggered in different manners to send the takeoff geographic location of the first unmanned aerial vehicle to the server, to implement operation diversification and facilitate operations performed by a user, thereby improving the user experience.

In an optional solution, the first obtaining unit 802 includes one of the following:

1) a third obtaining module, configured to obtain a geographic location of the first unmanned aerial vehicle when the first unmanned aerial vehicle takes off, the geographic location of the first unmanned aerial vehicle being used as the takeoff geographic location of the first unmanned aerial vehicle; or 2) a fourth obtaining module, configured to: obtain a geographic location of a control terminal when the first unmanned aerial vehicle takes off, a client running on the control terminal controlling the takeoff of the first unmanned aerial vehicle; and use the geographic location of the control terminal as the takeoff geographic location of the first unmanned aerial vehicle.

Optionally, in this embodiment, the geographic location of the first unmanned aerial vehicle when the first unmanned aerial vehicle takes off may be obtained in, but is not limited to, at least one of the following manners: 1) The control terminal obtains the geographic location of the first unmanned aerial vehicle collected by the first unmanned aerial vehicle when the first unmanned aerial vehicle takes off; or 2) The control terminal obtains, by detection, the geographic location of the first unmanned aerial vehicle when the first unmanned aerial vehicle takes off.

According to the embodiment provided in this application, the client running on the control terminal can obtain the takeoff geographic location of the first unmanned aerial vehicle collected by the first unmanned aerial vehicle when the first unmanned aerial vehicle takes off, or can obtain, by self-detection, the takeoff geographic location of the first unmanned aerial vehicle when the first unmanned aerial vehicle takes off. The takeoff geographic location of the first unmanned aerial vehicle is obtained in different manners, to satisfy actual requirements of different users, and ensure the accuracy of the obtained flight tag.

In an optional solution, the terminal further includes:

1) a display unit, configured to: after the flight tag returned by the server is obtained, display the flight tag in a client running on a control terminal, the client controlling the takeoff of the first unmanned aerial vehicle, and the flight tag further being used for indicating at least one of the following: a geographic name corresponding to the takeoff geographic location of the first unmanned aerial vehicle, a takeoff date of the first unmanned aerial vehicle, or a takeoff time of the first unmanned aerial vehicle.

Optionally, in this embodiment, the foregoing flight tag may include but is not limited to at least one of the following: a first flight tag used for indicating that the first unmanned aerial vehicle is not an unmanned aerial vehicle first taking off from the takeoff geographic location of the first unmanned aerial vehicle, or a second flight tag used for indicating that the first unmanned aerial vehicle is an unmanned aerial vehicle first taking off from the takeoff geographic location of the first unmanned aerial vehicle. In addition, the foregoing flight tag may further be used for indicating at least one of the following: a geographic name (for example, a location name) corresponding to the takeoff geographic location (for example, a location coordinate) of the first unmanned aerial vehicle, a takeoff date of the first unmanned aerial vehicle, or a takeoff time of the first unmanned aerial vehicle.

Specifically, descriptions are provided with reference to FIG. 4. The flight tag obtained after the first unmanned aerial vehicle flies for a plurality of times can be displayed in the client running on the control terminal. For example, takeoff geographic locations included in a first flight tag (represented by using "occupying for a first time") are as follows: "Eiffel Tower, France (Sep. 24, 2015)", "Madrid, Spain (Jul. 17, 2015)", "Hokkaido, Japan (Jun. 4, 2015)", and "Paradise Island, the Maldives (Apr. 30, 2015)"; and takeoff geographic locations included in a second flight tag (represented by "flying across") are as follows: "Triumphal arch, France (Sep. 23, 2015)", "Barcelona, Spain (Jul. 19, 2015)", and "Tokyo, Japan (Jun. 6, 2015)".

According to the embodiment provided in this application, the obtained flight tag is displayed in the client running on the control terminal, so that different users can share the flight tag in social space, and share different flying experiences by using the flight tag, thereby satisfying different actual requirements of the different users.

Embodiment 4

Figure 9:
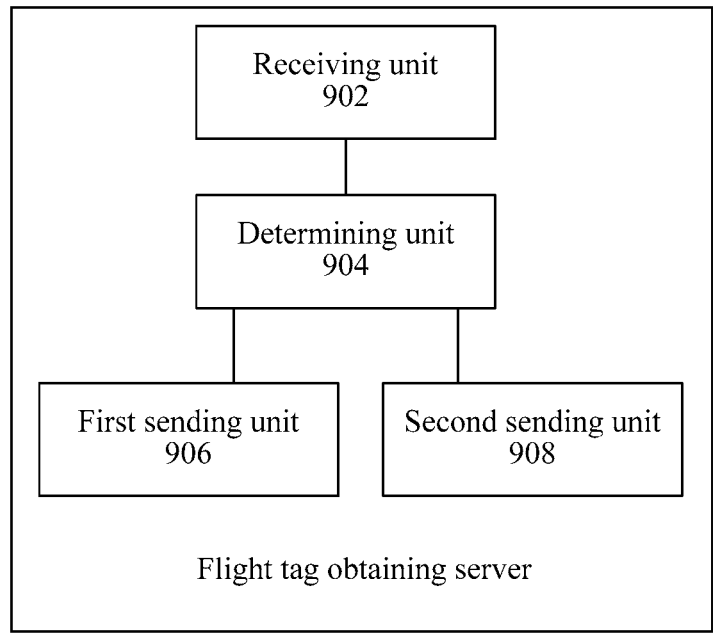
FIG. 9 is a schematic diagram of an optional flight tag obtaining server according to an embodiment of this application.

According to this embodiment of this application, a flight tag obtaining server is provided. As shown in FIG. 9, the server includes:

1) a receiving unit 902, configured to receive a takeoff geographic location of a first unmanned aerial vehicle when the first unmanned aerial vehicle takes off sent by a client, the client running on a control terminal and being configured to control the takeoff of the first unmanned aerial vehicle;

2) a determining unit 904, configured to determine whether there is a takeoff geographic location in stored takeoff geographic locations that is the same as the takeoff geographic location of the first unmanned aerial vehicle;

3) a first sending unit 906, configured to: when there is a takeoff geographic location that is the same as the takeoff geographic location of the first unmanned aerial vehicle, send a first flight tag to the client, the first flight tag being used for indicating that the first unmanned aerial vehicle is not an unmanned aerial vehicle first taking off from the takeoff geographic location of the first unmanned aerial vehicle; and 4) a second sending unit 908, configured to: when there is no takeoff geographic location that is the same as the takeoff geographic location of the first unmanned aerial vehicle, send a second flight tag to the client, the second flight tag being used for indicating that the first unmanned aerial vehicle is an unmanned aerial vehicle first taking off from the takeoff geographic location of the first unmanned aerial vehicle.

Optionally, in this embodiment, the foregoing flight tag obtaining server may be but is not limited to being applied to a process in which a client running on a control terminal obtains a flight tag of an unmanned aerial vehicle. The foregoing client running on the control terminal is configured to control takeoff of the unmanned aerial vehicle. For example, after receiving the takeoff geographic location of the first unmanned aerial vehicle when the first unmanned aerial vehicle takes off sent by the client, a server determines whether there is a takeoff geographic location in stored takeoff geographic locations that is the same as the takeoff geographic location of the first unmanned aerial vehicle, to send different first flight tags or second flight tags to the client according to different determining results, the client running on the control terminal and being configured to control the takeoff of the first unmanned aerial vehicle. As shown in FIG. 3, the flight tag of the unmanned aerial vehicle returned by the server is displayed in the client (a user name is ID_01) running on the control terminal. For example, the flight tags returned by the server include a flight tag_1 and a flight tag_2. For example, the flight tags may be "occupying for a first time" or "flying across". The foregoing is merely exemplary, and no limitation is set in this embodiment.

It should be noted that, in this embodiment, the server receives a takeoff geographic location of a first unmanned aerial vehicle when the first unmanned aerial vehicle takes off sent by a client, the client running on a control terminal and being configured to control the takeoff of the first unmanned aerial vehicle; determines whether there is a takeoff geographic location in stored takeoff geographic locations that is the same as the takeoff geographic location of the first unmanned aerial vehicle; and if yes, sends a first flight tag to the client, the first flight tag being used for indicating that the first unmanned aerial vehicle is not an unmanned aerial vehicle first taking off from the takeoff geographic location of the first unmanned aerial vehicle; or if no, sends a second flight tag to the client, the second flight tag being used for indicating that the first unmanned aerial vehicle is an unmanned aerial vehicle first taking off from the takeoff geographic location of the first unmanned aerial vehicle, and the flight tag being used for indicating whether the first unmanned aerial vehicle is an unmanned aerial vehicle first taking off from the takeoff geographic location of the first unmanned aerial vehicle. The server obtains a corresponding flight tag according to the obtained takeoff geographic location, and sends the flight tag to the client, so that the server establishes a common database of unmanned aerial vehicles on the server by using the obtained takeoff geographic location of the unmanned aerial vehicle. Further, interaction is established between the client running on the control terminal and the server by using the database, to implement sharing of the takeoff geographic location of the unmanned aerial vehicle, and return the flight tag corresponding to the unmanned aerial vehicle to the control terminal according to the takeoff geographic location of the unmanned aerial vehicle. Therefore, the foregoing flight tag of the unmanned aerial vehicle can be shared in social space of the client.

Optionally, in this embodiment, the flight tag may include but is not limited to at least one of the following: a first flight tag used for indicating that the first unmanned aerial vehicle is not an unmanned aerial vehicle first taking off from the takeoff geographic location of the first unmanned aerial vehicle, or a second flight tag used for indicating that the first unmanned aerial vehicle is an unmanned aerial vehicle first taking off from the takeoff geographic location of the first unmanned aerial vehicle.

Optionally, in this embodiment, the foregoing flight tag may further be but is not limited to being used for indicating at least one of the following: a geographic name corresponding to the takeoff geographic location of the first unmanned aerial vehicle, a takeoff date of the first unmanned aerial vehicle, or a takeoff time of the first unmanned aerial vehicle. For example, a first unmanned aerial vehicle is controlled by a client (a user name is ID_01) running on a control terminal. After the first unmanned aerial vehicle flies for a plurality of times, an obtained flight tag displayed in the client may be shown in FIG. 4. Takeoff geographic locations included in a first flight tag (represented by using "occupying for a first time") are as follows: "Eiffel Tower, France (Sep. 24, 2015)", "Madrid, Spain (Jul. 17, 2015)", "Hokkaido, Japan (Jun. 4, 2015)", and "Paradise Island, the Maldives (Apr. 30, 2015)". Takeoff geographic locations included in a second flight tag (represented by using "flying across") are as follows: "Triumphal arch, France (Sep. 23, 2015)", "Barcelona, Spain (Jul. 19, 2015)", and "Tokyo, Japan (Jun. 6, 2015)".

Optionally, in this embodiment, the takeoff geographic location of the foregoing first unmanned aerial vehicle may include but is not limited to one of the following: 1) a geographic location of the first unmanned aerial vehicle when the first unmanned aerial vehicle takes off; or 2) a geographic location of the control terminal when the first unmanned aerial vehicle takes off. When the takeoff geographic location of the first unmanned aerial vehicle is the geographic location of the first unmanned aerial vehicle when the first unmanned aerial vehicle takes off, the takeoff geographic location may be obtained in, but is not limited to, at least one of the following manners: 1) The control terminal obtains the geographic location of the first unmanned aerial vehicle collected by the first unmanned aerial vehicle when the first unmanned aerial vehicle takes off; or 2) The control terminal obtains, by detection, the geographic location of the first unmanned aerial vehicle when the first unmanned aerial vehicle takes off.

Optionally, in this embodiment, the determining whether there is a takeoff geographic location in stored takeoff geographic locations that is the same as the takeoff geographic location of the first unmanned aerial vehicle includes at least one of the following:

1) determining whether location information of the takeoff geographic location of the first unmanned aerial vehicle is consistent with location information of the stored takeoff geographic locations; or 2) determining whether region indication information in location information of the takeoff geographic location of the first unmanned aerial vehicle is consistent with region indication information in location information of the stored takeoff geographic locations, the region indication information being a part of the location information.

That is, a principle for determining a same takeoff geographic location may include but is not limited to at least one of the following: the location information is completely consistent, or the region indication information (a part of the location information) used for indicating a region in which the first unmanned aerial vehicle is located is consistent.

Optionally, in this embodiment, that the first flight tag is sent to a client includes: obtaining a geographic name corresponding to the takeoff geographic location of the first unmanned aerial vehicle, and sending the first flight tag at least including the geographic name; that the second flight tag is sent to a client includes: obtaining a geographic name corresponding to the takeoff geographic location of the first unmanned aerial vehicle, storing a correspondence between the takeoff geographic location of the first unmanned aerial vehicle and the obtained geographic name, and sending the second flight tag at least including the geographic name.

Optionally, in this embodiment, the foregoing server may adjust, but is not limited to, adjusting, according to the obtained takeoff geographic location of the unmanned aerial vehicle, the takeoff geographic locations stored in the database of the server. Specifically, when the second flight tag used for indicating that the first unmanned aerial vehicle is an unmanned aerial vehicle first taking off from the takeoff geographic location of the first unmanned aerial vehicle is obtained, the geographic name corresponding to the takeoff geographic location of the first unmanned aerial vehicle is obtained, and the correspondence between the takeoff geographic location of the first unmanned aerial vehicle and the obtained geographic name is stored, to newly add a takeoff geographic location to the database.

According to the embodiment provided in this embodiment, the server obtains a corresponding flight tag according to the obtained takeoff geographic location, and sends the flight tag to the client, so that the server establishes a common database of unmanned aerial vehicles on the server by using the obtained takeoff geographic location of the unmanned aerial vehicle. Further, interaction is established between the client running on the control terminal and the server by using the database, to implement sharing of the takeoff geographic location of the unmanned aerial vehicle, and return the flight tag corresponding to the unmanned aerial vehicle to the control terminal according to the takeoff geographic location of the unmanned aerial vehicle. Therefore, the foregoing flight tag of the unmanned aerial vehicle can be shared in social space of the client.

In an optional solution, the determining unit 904 includes at least one of the following:

1) a first determining module, configured to determine whether location information of the takeoff geographic location of the first unmanned aerial vehicle is consistent with location information of the stored takeoff geographic locations; or 2) a second determining module, configured to determine whether region indication information in location information of the takeoff geographic location of the first unmanned aerial vehicle is consistent with region indication information in location information of the stored takeoff geographic locations, the region indication information being a part of the location information.

That is, a principle for determining a same takeoff geographic location may include but is not limited to at least one of the following: the location information is completely consistent, or the region indication information (a part of the location information) used for indicating a region in which the first unmanned aerial vehicle is located is consistent.

In an optional solution, 1) the first sending unit 906 includes a first sending module, configured to obtain a geographic name corresponding to the takeoff geographic location of the first unmanned aerial vehicle, and send the first flight tag at least including the geographic name; and 2) the second sending unit 908 includes a second sending module, configured to obtain a geographic name corresponding to the takeoff geographic location of the first unmanned aerial vehicle, store a correspondence between the takeoff geographic location of the first unmanned aerial vehicle and the obtained geographic name, and send the second flight tag at least including the geographic name.

Optionally, in this embodiment, the foregoing server may adjust, but is not limited to, adjusting, according to the obtained takeoff geographic location of the unmanned aerial vehicle, the takeoff geographic locations stored in the database of the server. Specifically, when the second flight tag used for indicating that the first unmanned aerial vehicle is an unmanned aerial vehicle first taking off from the takeoff geographic location of the first unmanned aerial vehicle is obtained, the geographic name corresponding to the takeoff geographic location of the first unmanned aerial vehicle is obtained, and the correspondence between the takeoff geographic location of the first unmanned aerial vehicle and the obtained geographic name is stored, to newly add a takeoff geographic location to the database.

Embodiment 5

Figure 10:
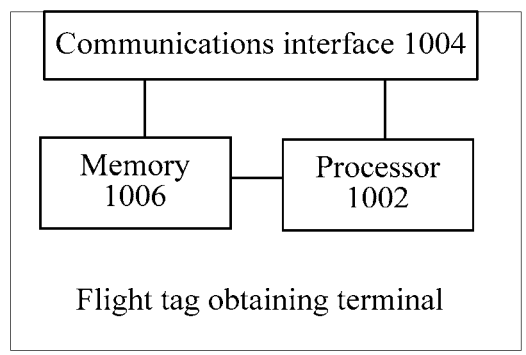
FIG. 10 is a schematic structural diagram of an optional flight tag obtaining terminal according to an embodiment of this application.

According to this embodiment of this application, a flight tag obtaining terminal configured to implement the foregoing flight tag obtaining method is further provided. As shown in FIG. 10, the terminal includes:

1) a processor (processing circuitry) 1002, configured to obtain a takeoff geographic location of a first unmanned aerial vehicle when the first unmanned aerial vehicle takes off;

2) a communications interface 1004, connected to the processor 1002, and configured to send the takeoff geographic location of the first unmanned aerial vehicle to a server; and obtain a flight tag returned by the server, the flight tag being used for indicating whether the first unmanned aerial vehicle is an unmanned aerial vehicle first taking off from the takeoff geographic location of the first unmanned aerial vehicle; and 3) a memory 1006, connected to the processor 1002 and the communications interface 1004, and configured to store the takeoff geographic location of the first unmanned aerial vehicle and the flight tag returned by the server.

Optionally, for a specific example in this embodiment, refer to the examples described in Embodiment 1 and Embodiment 2, and details are not described herein again in this embodiment.

Embodiment 6

Figure 11:
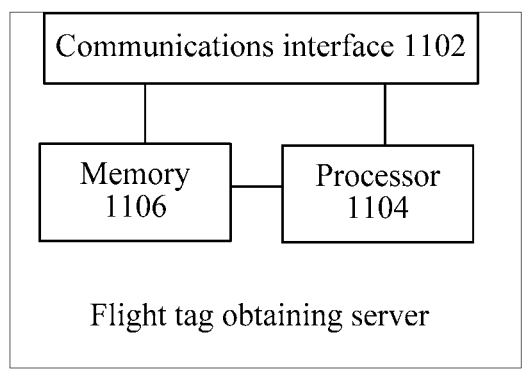
FIG. 11 is a schematic structural diagram of an optional flight tag obtaining server according to an embodiment of this application.

According to this embodiment of this application, a flight tag obtaining server configured to implement the foregoing flight tag obtaining method is further provided. As shown in FIG. 11, the server includes:

1) a communications interface 1102, configured to receive a takeoff geographic location of a first unmanned aerial vehicle when the first unmanned aerial vehicle takes off sent by a client, the client running on a control terminal and being configured to control the takeoff of the first unmanned aerial vehicle;

2) a processor (e.g., processing circuitry) 1104, connected to the communications interface 1102, and configured to determine whether there is a takeoff geographic location in stored takeoff geographic locations that is the same as the takeoff geographic location of the first unmanned aerial vehicle; and if yes, send a first flight tag to the client, the first flight tag being used for indicating that the first unmanned aerial vehicle is not an unmanned aerial vehicle first taking off from the takeoff geographic location of the first unmanned aerial vehicle; or if no, send a second flight tag to the client, the second flight tag being used for indicating that the first unmanned aerial vehicle is an unmanned aerial vehicle first taking off from the takeoff geographic location of the first unmanned aerial vehicle; and 3) a memory 1106, connected to the communications interface 1102 and the processor 1104, and configured to store the takeoff geographic location of the first unmanned aerial vehicle and the flight tag returned by the server.

Optionally, for a specific example in this embodiment, refer to the examples described in Embodiment 1 and Embodiment 2, and details are not described herein again in this embodiment.

Embodiment 7

According to this embodiment of this application, a storage medium is further provided. Optionally, in this embodiment, the storage medium is configured to store program code for performing the following steps:

S1: Obtain a takeoff geographic location of a first unmanned aerial vehicle when the first unmanned aerial vehicle takes off.

S2: Send the takeoff geographic location of the first unmanned aerial vehicle to a server.

S3: Obtain a flight tag returned by the server, the flight tag being used for indicating whether the first unmanned aerial vehicle is an unmanned aerial vehicle first taking off from the takeoff geographic location of the first unmanned aerial vehicle.

Optionally, in this embodiment, the storage medium is further configured to store program code for performing the following steps:

S1: Receive a takeoff geographic location of a first unmanned aerial vehicle when the first unmanned aerial vehicle takes off sent by a client, the client running on a control terminal and being configured to control the takeoff of the first unmanned aerial vehicle.

S2: Determine whether there is a takeoff geographic location in stored takeoff geographic locations that is the same as the takeoff geographic location of the first unmanned aerial vehicle.

S3: If yes, send a first flight tag to the client, the first flight tag being used for indicating that the first unmanned aerial vehicle is not an unmanned aerial vehicle first taking off from the takeoff geographic location of the first unmanned aerial vehicle.

S4: If no, send a second flight tag to the client, the second flight tag being used for indicating that the first unmanned aerial vehicle is an unmanned aerial vehicle first taking off from the takeoff geographic location of the first unmanned aerial vehicle.

Optionally, in this embodiment, the storage medium may include but is not limited to a non-transitory or transitory medium that may store program code such as a USB flash drive, a read-only memory (ROM), a random access memory (RAM), a removable hard disk, a magnetic disk, or an optical disc.

Optionally, for a specific example in this embodiment, refer to the examples described in Embodiment 1 and Embodiment 2, and details are not described herein again in this embodiment.

The sequence numbers of the preceding embodiments of this application are merely for description purpose but do not indicate the preference of the embodiments.

When the integrated unit in the foregoing embodiment is implemented in a form of a software functional unit and sold or used as an independent product, the integrated unit may be stored in the foregoing computer-readable storage medium. Based on such an understanding, the technical solutions of this application essentially, or the part contributing to the existing technology, or all or some of the technical solutions may be implemented in a form of a software product. The computer software product is stored in a storage medium and includes instructions for instructing one or more computer devices (which may be a personal computer, a server, or a network device) to perform all or some of the steps of the methods in the embodiments of this application.

In the foregoing embodiments of this application, descriptions of the embodiments have different emphases, and for parts that are not described in detail in one embodiment, refer to the related descriptions of the other embodiments.

In the several embodiments provided in this application, it should be understood that the disclosed client may be implemented in other manners. The described apparatus embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The above descriptions are merely exemplary embodiments of this application, and it should be noted that, persons of ordinary skill in the art may make various improvements and refinements without departing from the spirit of this application. All such modifications and refinements should also be intended to be covered by this application.

What is claimed is:

1. A non-transitory computer-readable medium storing instructions which when executed by at least one processor cause the at least one processor to perform operations comprising:
   obtaining, by the at least one processor of an information processing apparatus, a first takeoff geographic location of a first unmanned aerial vehicle when the first unmanned aerial vehicle takes off from the first takeoff geographic location, the information processing apparatus executing an application controlling the first unmanned aerial vehicle;
   sending, by the at least one processor of the information processing apparatus, the first takeoff geographic location of the first unmanned aerial vehicle to a server;
   receiving a first flight tag from the server, the first flight tag indicating whether another unmanned aerial vehicle took off from the first takeoff geographic location of the first unmanned aerial vehicle before the first unmanned aerial vehicle took off from the first take off geographic location, based on data recorded in a database; and
   displaying the flight tag in the application executed by the information processing apparatus, the flight tag indicating a first geographic name corresponding to the first takeoff geographic location of the first unmanned aerial vehicle.

2. The non-transitory computer-readable medium according to claim 1, wherein the sending comprises:
   when the first unmanned aerial vehicle takes off, sending the first takeoff geographic location of the first unmanned aerial vehicle to the server; or
   after the first unmanned aerial vehicle takes off, sending the first takeoff geographic location of the first unmanned aerial vehicle to the server.

3. The non-transitory computer-readable medium according to claim 1, wherein the sending comprises:
   after the first unmanned aerial vehicle takes off, obtaining a sending instruction, and sending, in response to the sending instruction, the first takeoff geographic location of the first unmanned aerial vehicle to the server; or
   after the first unmanned aerial vehicle takes off, determining whether a preset sending moment is reached, and based on a determination that the preset sending moment is reached, sending the first takeoff geographic location of the first unmanned aerial vehicle to the server.

4. The non-transitory computer-readable medium according to claim 3, wherein the obtaining the sending instruction comprises:
receiving a user selection of a predetermined trigger button, collecting a predetermined voice, or obtaining a predetermined motion gesture.

5. The non-transitory computer-readable medium according to claim 3, wherein the preset sending moment is a moment that satisfies a predetermined condition or a preset cycle end moment.

6. The non-transitory computer-readable medium according to claim 1, wherein the obtained first takeoff geographic location of the first unmanned aerial vehicle is a geographic location of the first unmanned aerial vehicle when the first unmanned aerial vehicle takes off.

7. The non-transitory computer-readable medium according to claim 6, wherein the first geographic location of the first unmanned aerial vehicle when the first unmanned aerial vehicle takes off is collected by the first unmanned aerial vehicle and provided to the information processing apparatus.

8. The non-transitory computer-readable medium according to claim 6, wherein the first geographic location of the first unmanned aerial vehicle when the first unmanned aerial vehicle takes off is detected by the information processing apparatus.

9. The non-transitory computer-readable medium according to claim 1, wherein the obtained first takeoff geographic location of the first unmanned aerial vehicle is a geographic location of the information processing apparatus that controls the takeoff of the first unmanned aerial vehicle.

10. The non-transitory computer-readable medium according to claim 1, wherein the displaying comprises:
when the first flight tag indicates no other unmanned aerial vehicle took off from the first takeoff geographic location of the first unmanned aerial vehicle before the first unmanned aerial vehicle took off from the first geographic location, displaying the first geographic name corresponding to the first takeoff geographic location of the first unmanned aerial vehicle on a list in the application executed by the information processing apparatus, the list including second geographic names each corresponding to a second flight tag received from the server indicating no other unmanned aerial vehicle took off from a second takeoff geographic location corresponding to the respective second geographic name before the first unmanned aerial vehicle.

11. A method, comprising:
obtaining, by circuitry of an information processing apparatus, a first takeoff geographic location of a first unmanned aerial vehicle when the first unmanned aerial vehicle takes off from the first takeoff geographic location, the information processing apparatus executing an application controlling the first unmanned aerial vehicle;
sending, by the circuitry of the information processing apparatus, the first takeoff geographic location of the first unmanned aerial vehicle to a server;
receiving a first flight tag from the server, the first flight tag indicating whether another unmanned aerial vehicle took off from the first takeoff geographic location of the first unmanned aerial vehicle before the first unmanned aerial vehicle took off from the first take off geographic location, based on data recorded in a database; and
displaying the flight tag in the application executed in the information processing apparatus, the flight tag indicating a first geographic name corresponding to the first takeoff geographic location of the first unmanned aerial vehicle.

12. The method according to claim 11, wherein the sending comprises:
when the first unmanned aerial vehicle takes off, sending the first takeoff geographic location of the first unmanned aerial vehicle to the server; or
after the first unmanned aerial vehicle takes off, sending the first takeoff geographic location of the first unmanned aerial vehicle to the server.

13. The method according to claim 11, wherein the sending comprises:
after the first unmanned aerial vehicle takes off, obtaining a sending instruction, and sending, in response to the sending instruction, the first takeoff geographic location of the first unmanned aerial vehicle to the server; or
after the first unmanned aerial vehicle takes off, determining whether a preset sending moment is reached, and based on a determination that the preset sending moment is reached, sending the first takeoff geographic location of the first unmanned aerial vehicle to the server.

14. The method according to claim 13, wherein the obtaining the sending instruction comprises:
receiving a user selection of a predetermined trigger button, collecting a predetermined voice, or obtaining a predetermined motion gesture.

15. The method according to claim 13, wherein the preset sending moment is a moment that satisfies a predetermined condition or a preset cycle end moment.

16. The method according to claim 11, wherein the obtained first takeoff geographic location of the first unmanned aerial vehicle is a geographic location of the first unmanned aerial vehicle when the first unmanned aerial vehicle takes off.

17. The method according to claim 16, wherein the first geographic location of the first unmanned aerial vehicle when the first unmanned aerial vehicle takes off is collected by the first unmanned aerial vehicle and provided to the information processing apparatus.

18. The method according to claim 11, wherein the obtained first takeoff geographic location of the first unmanned aerial vehicle is a geographic location of the information processing apparatus that controls the takeoff of the first unmanned aerial vehicle.

19. The method according to claim 11, wherein the displaying comprises:
when the first flight tag indicates no other unmanned aerial vehicle took off from the first takeoff geographic location of the first unmanned aerial vehicle before the first unmanned aerial vehicle took off from the first geographic location, displaying the first geographic name corresponding to the first takeoff geographic location of the first unmanned aerial vehicle on a list in the application executed by the information processing apparatus, the list including second geographic names each corresponding to a second flight tag received from the server indicating no other unmanned aerial vehicle took off from a second takeoff geographic location corresponding to the respective second geographic name before the first unmanned aerial vehicle.

20. An apparatus, comprising circuitry configured to:
obtain a first takeoff geographic location of a first unmanned aerial vehicle when the first unmanned aerial vehicle takes off from the first takeoff geographic location via an application controlling the first unmanned aerial vehicle;
send the first takeoff geographic location of the first unmanned aerial vehicle to a server;
receive a first flight tag from the server, the first flight tag indicating whether another unmanned aerial vehicle took off from the first takeoff geographic location of the first unmanned aerial vehicle before the first unmanned aerial vehicle took off from the first take off geographic location, based on data recorded in a database; and
display the flight tag in the application controlling the first unmanned aerial vehicle, the flight tag indicating a first geographic name corresponding to the first takeoff geographic location of the first unmanned aerial vehicle.

* * * * *